(12) United States Patent
McGregor et al.

(10) Patent No.: US 9,811,576 B2
(45) Date of Patent: Nov. 7, 2017

(54) DIGITAL ASSET MANAGEMENT SYSTEM (DAMS)

(71) Applicant: Xdrive, LLC, Dulles, VA (US)

(72) Inventors: Lucas McGregor, Los Angeles, CA (US); Mike Depaoli, Windsor, CA (US); Adrian Gould, Los Angeles, CA (US); Chad Hill, Hamburg, PA (US); Michael Thomas Ritchie, Laveen, AZ (US); Kyle Kincaid, Marina del Ray, CA (US); Glenn Lingle, Westchester, CA (US); Joseph Provost, Los Angeles, CA (US); Maria Vazquez, Buenos Aires (AR)

(73) Assignee: Oath Inc., Dulles, VA (US)

( * ) Notice: Subject to any disclaimer, the term of this patent is extended or adjusted under 35 U.S.C. 154(b) by 50 days.

(21) Appl. No.: 14/877,911

(22) Filed: Oct. 7, 2015

(65) Prior Publication Data
US 2016/0026702 A1    Jan. 28, 2016

Related U.S. Application Data

(63) Continuation of application No. 12/074,359, filed on Mar. 3, 2008, now abandoned.

(60) Provisional application No. 60/904,840, filed on Mar. 2, 2007.

(51) Int. Cl.
*G06F 17/30* (2006.01)
*G06F 21/62* (2013.01)

(52) U.S. Cl.
CPC .. *G06F 17/30575* (2013.01); *G06F 17/30029* (2013.01); *G06F 17/30064* (2013.01); *G06F 17/30386* (2013.01); *G06F 17/30598* (2013.01); *G06F 21/6218* (2013.01)

(58) Field of Classification Search
CPC ......... G06F 17/30073; G06F 17/30112; G06F 17/30575; G06F 17/30029; G06F 17/30064; G06F 17/30386; G06F 17/30598; G06F 21/6218
See application file for complete search history.

(56) References Cited

U.S. PATENT DOCUMENTS

| 5,740,425 A | 4/1998 | Povilus |
| 6,484,156 B1 | 11/2002 | Gupta et al. |

(Continued)

*Primary Examiner* — Tarek Chbouki
(74) *Attorney, Agent, or Firm* — Finnegan, Henderson, Farabow, Garrett & Dunner, L.L.P.

(57) ABSTRACT

A digital asset management system (DAMS) provides an integrated user experience for the rapid and facile manipulation of a users digital assets in an online environment. Spanning the spectrum of digital assets, the DAMS system set forth herein enables users to tag, filter, collect, and show such digital assets in a manner which requires preferably minimal user interaction in order to achieve digital asset management and exhibition. Sharing among friends and family becomes much easier and incoming digital assets may be automatically segregated according to user choices or history to enable easier management of such assets. Recognition of relationships, characteristics, features, and the like between different assets may occur automatically and develop an ongoing fashion to enable association of such similar assets into "collections" or the like.

19 Claims, 10 Drawing Sheets

(56) References Cited

U.S. PATENT DOCUMENTS

| | | | |
|---|---|---|---|
| 6,526,418 B1 * | 2/2003 | Midgley | G06F 11/1451 |
| | | | 707/640 |
| 7,155,676 B2 | 12/2006 | Land et al. | |
| 7,167,864 B1 | 1/2007 | Vasudevan | |
| 7,197,493 B2 | 3/2007 | Ashby et al. | |
| 7,539,656 B2 | 5/2009 | Fratkina et al. | |
| 7,613,993 B1 | 11/2009 | Baer et al. | |
| 7,860,895 B1 | 12/2010 | Scofield et al. | |
| 2002/0180803 A1 | 12/2002 | Kaplan et al. | |
| 2002/0186844 A1 | 12/2002 | Levy et al. | |
| 2003/0093790 A1 * | 5/2003 | Logan | G06F 17/30265 |
| | | | 725/38 |
| 2004/0024720 A1 | 2/2004 | Fairweather | |
| 2004/0054665 A1 | 3/2004 | Yoo et al. | |
| 2005/0038811 A1 * | 2/2005 | Pivowar | G06F 17/30578 |
| 2005/0125621 A1 * | 6/2005 | Shah | G06F 17/30595 |
| | | | 711/173 |
| 2005/0160014 A1 | 7/2005 | Moss et al. | |
| 2005/0193015 A1 | 9/2005 | Logston et al. | |
| 2005/0246374 A1 | 11/2005 | Blinn et al. | |
| 2006/0080432 A1 * | 4/2006 | Spataro | H04L 12/1831 |
| | | | 709/224 |
| 2006/0095373 A1 | 5/2006 | Venkatasubramanian et al. | |
| 2006/0129576 A1 | 6/2006 | Carpentier et al. | |
| 2007/0011138 A1 | 1/2007 | Boucard et al. | |
| 2007/0143420 A1 | 6/2007 | Daniell | |
| 2007/0156770 A1 | 7/2007 | Espelin et al. | |
| 2007/0156842 A1 * | 7/2007 | Vermeulen | G06F 17/30212 |
| | | | 709/217 |
| 2007/0185879 A1 * | 8/2007 | Roublev | G06F 17/30073 |
| 2007/0208685 A1 | 9/2007 | Blumenau et al. | |
| 2007/0260572 A1 | 11/2007 | Boucard et al. | |
| 2008/0072294 A1 | 3/2008 | Chatterjee | |
| 2008/0091549 A1 | 4/2008 | Chang et al. | |
| 2008/0201734 A1 | 8/2008 | Lyon et al. | |
| 2008/0207182 A1 | 8/2008 | Maharajh et al. | |

* cited by examiner

| CacheManager |
|---|
| □ sessionCacheMap : WeakHashMap |
| □ instance : CacheManager |
| □ sizeMap : Map |
| □ DEFAULT_CACHE_SIZE : Integer |
| ▣ <<create>> CacheManager() |
| ◉ getInstance() : CacheManager |
| ▣ getSessionCacheMap() : WeakHashMap |
| ▣ addCache(in cache : SimpleCache,in cacheName : String) : SimpleCache |
| ▣ getInnerMap() : Map |
| ▣ put(in cacheName : String,in key : Object,in value : Object) : void |
| ▣ getCache(in cacheName : String) : SimpleCache |
| ◉ put(in cacheName : String,in key : Object,in value : Object) : void |
| ◉ get(in cacheName : String,in key : Object) : Object |
| ◉ get(in exampleTo : AbstractTransferObject) : AbstractTransferObject |
| ◉ put(in to : AbstractTransferObject) : void |
| ▣ initializeCache(in cacheName : String) : SimpleCache |
| ◇ getSizeMap() : Map |
| ▣ purgeCache(in name : String) : void |
| ▣ currentSession() |
| ▣ purgeCache(in name : String) : void |
| ◉ remove(in to : AbstractTransferObject) : void |

Figure 5

|  | AbstractDAO |
| --- | --- |
| □ mutexs : Set | |
| □ CACHED_NULL_INDICATOR : char | |
| □ logger : Category | |
| □ DATASOURCE_NAME : String | |
| □ dataAccessCalls : Map | |
| ◇ context : Context | |
| ◇ testConnection : Connection | |
| ◇ connection : Connection | |
| ◇ dsm : DataSourceManager | |
| ◇ dsro : DataSourceRequestObj | |
| ◇ find(in param : Object,in cacheName : String) : Object | |
| ◇ getDataAccessCalls() : Map | |
| ◇ setDataAccessCalls(in dataAccessCalls : Map) : void | |
| ▣ getMutex(in session : SessionData,in cacheName : String,in key : Object) : Mutex | |
| ● init() : void | |
| ● destroy() : void | |
| ● isInTestMode() : boolean | |
| ● setTestConnection(in _testConnection : Connection) : void | |
| ● closeConnection(in con : Connection) : void | |
| ● closeStatement(in statement : Statement) : void | |
| ● closeResultSet(in rs : ResultSet) : void | |
| ● getConnection() : Connection | |
| ● getDataSourceManager() : DataSourceManager | |
| ◇ setColumn(in ps : PreparedStatement,in col : int,in val : String) : void | |
| ◇ setColumn(in ps : PreparedStatement,in col : int,in val : Timestamp) : void | |
| ◇ setColumn(in ps : PreparedStatement,in col : int,in val : int) : void | |
| ◇ setColumn(in ps : PreparedStatement,in col : int,in val : long) : void | |
| ◇ setColumn(in ps : PreparedStatement,in col : int,in val : Date) : void | |
| ◇ setColumn(in ps : PreparedStatement,in col : int,in val : Long) : void | |
| ◇ setColumn(in ps : PreparedStatement,in col : int,in val : double) : void | |
| ◇ setColumn(in ps : PreparedStatement,in col : int,in val : byte[]) : void | |
| ● getNow() : Timestamp | |
| ● getNow(in shift : long) : Timestamp | |
| ◇ synchronizedFind(in key : Object,in params : QueryParameters,in cacheName : String) : Object | |
| ◇ setColumn(in ps : PreparedStatement,in col : int,in val : long) : void | |
| ◇ setColumn(in ps : PreparedStatement,in col : int,in val : Date) : void | |
| ◇ setColumn(in ps : PreparedStatement,in col : int,in val : Long) : void | |
| ◇ setColumn(in ps : PreparedStatement,in col : int,in val : double) : void | |
| ◇ setColumn(in ps : PreparedStatement,in col : int,in val : byte[]) : void | |
| ● getNow() : Timestamp | |
| ● getNow(in shift : long) : Timestamp | |
| ◇ synchronizedFind(in key : Object,in params : QueryParameters,in cacheName : String) : Object | |

Figure 8

DIGITAL ASSET MANAGEMENT SYSTEM (DAMS)

CROSS-REFERENCES TO RELATED APPLICATIONS

Applicant(s) and/or Inventor(s) hereby rescind any disclaimer and/or any arguments made in any prior related application. Such disclaimer(s) and/or argument(s) as well as any prior art relevant to such disclaimer(s) and/or argument(s) may need to be revisited by the Examiner.

This patent application is a continuation of U.S. patent application Ser. No. 12/074,359, filed on Mar. 3, 2008, which is related to and claims priority from U.S. Provisional Patent Application No. 60/904,840, filed on Mar. 2, 2007. The disclosures of the above applications are incorporated herein by reference to their entireties.

COPYRIGHT AUTHORIZATION

Portions of the disclosure of this patent document may contain material which is subject to copyright and/or mask work protection. The copyright and/or mask work owner has no objection to the facsimile reproduction by anyone of the patent document or the patent disclosure, as it appears in the Patent and Trademark Office patent file or records, but otherwise reserves all copyright and/or mask work rights whatsoever. 37 C.F.R. §1.71(d).

BACKGROUND OF THE INVENTION

Field of the Invention

This invention relates to data storage systems and more particularly to a digital asset management system for a plurality of users.

Description of the Related Art

Incorporated by reference in their entirety are the following patents, patent applications, and patent application publications relating to the underlying Xdrive system:

U.S. Provisional Patent Application Ser. No. 60/163,626 filed Nov. 4, 1999 for Shared Internet Storage Resource, User Interface System, and Method;

U.S. patent application Ser. No. 09/570,583 filed May 12, 2000 for Shared Internet Storage Resource, User Interface System, and Method which issued as U.S. Pat. No. 6,351,776 B1 on Feb. 26, 2002;

U.S. patent application Ser. No. 10/073,775 filed Feb. 11, 2002 for Shared Internet Storage Resource, User Interface System, and Method which issued as U.S. Pat. No. 6,985,927 on Jan. 10, 2006;

U.S. patent application Ser. No. 11/075,311 filed Mar. 8, 2005 for Shared Internet Storage Resource, User Interface System, and Method which was published as United States patent application publication number US 2005-0193132 A1 on Sep. 1, 2005; and U.S. patent application Ser. No. 11/089,173 filed Mar. 23, 2005 for Shared Internet Storage Resource, User Interface System, and Method which issued as U.S. Pat. No. 7,171,472 on Jan. 30, 2007;

U.S. patent application Ser. No. 11/089,174 filed Mar. 24, 2005 for Shared Internet Storage Resource, User Interface System, and Method which was published as United States patent application publication number US 2005-0204020 A1 on Sep. 15, 2005;

U.S. patent application Ser. No. 11/089,397 filed Mar. 24, 2005 for Shared Internet Storage Resource, User Interface System, and Method which was published as United States patent application publication number US 2005-0171956 A1 on Aug. 4, 2005; and U.S. patent application Ser. No. 11/601,234 filed Nov. 17, 2006 for Network Personal Digital Video Recorder System (NPDVR).

The foregoing patent-related documents generally disclose the Xdrive system and may be used for reference and description with regards to the Xdrive system.

Increasingly, individuals with Internet access are subject to a large number of relevant and interesting information in the form of files, webpages, e-mails, audio/video media files, and the like. This is one of the great benefits of the general acceptance of the Internet, electronic communications, and the ability for electronic communication to interactively connect people despite great distances. Younger individuals having the available time are particularly involved in the dynamic informational environment provided by the Internet.

However, the increased availability and presentation of electronic media via the Internet or otherwise is somewhat akin to getting a drink of water from a fire hose. It has what the user wants, but not in a form that is readily consumed. While the fire hose paradigm has become more well known in the recent past, it may be particularly appropriate for the onslaught of available incoming media and information that is available to a person who accesses the Internet.

In the past, certain utilities have been available to users to help them sort and segregate information. These have generally been limited in scope and have generally not taken into account the ongoing and extensive nature of new, incoming media and information to which such users are subject from friends, family, unknown third-party commercial entities, and the like.

As a result, it would be advantageous and very helpful for users to be able to selectively and/or automatically organize, segregate, evaluate, and handle much of the media, that comes into the user on a daily (and even hourly) basis.

Prior attempts have been made in the art with respect to the management of digital assets, media files and otherwise. Brief descriptions of some of such prior attempts are set forth below. While the descriptions are believed to be accurate, no admission is made by them regarding their subject matter which is solely defined by the patent or reference involved.

U.S. Patent Application Publication No. 20020180803 issued to Kaplan et al. on Dec. 5, 2002 for Systems, Methods And Computer. Program Products For Managing Multimedia Content discloses multimedia content that may be stored, manipulated, displayed, and packaged. The system provides a visual inventory of such files to facilitate retrieval of desired content from external removable media such as CDs, DVDs, or removable disk drives. The system enables the creation of removable media with desired multimedia content and hierarchical structure for playback as well as labeling and the like. Multimedia content may be shared in a simple manner with other such as friends or family members and the user may select specific multimedia content to be accessed by specified individuals via the Internet.

U.S. Patent Application Publication No. 20020186844 issued to Levy et al. on Dec. 12, 2002 for User-friendly Rights Management Systems And Methods discloses a system where content is identified with an identifier which, once extracted, is used to index the database to locate a corresponding usage rule. Usage rights may be determined by linking the content identifier to external data with such usage rights possibly including the scope of permissible copying, rendering, transferring, etc. Content usage may be tracked via an identifier for billing, etc.

U.S. Patent Application Publication No. 20040024720 issued to Fairweather on Feb. 5, 2004 for System And Method For Managing Knowledge discloses a memory system that may form collections of datums and enable manipulation and exchange of these collections both within a local machine as well as across a network. Such collections may support the ability to attach arbitrary tags or annotations to the binary data they contain without in any way altering the binary representation itself. Small executables, or "widgets," may operate upon data for which they have minimal information, but least know the "type" of data involved.

U.S. Patent Application Publication No. 20050246374 issued to Blinn et al. on Nov. 3, 2005 for a System And Method For Selection Of Media Items discloses searchable media items based on tagged metadata in accordance with user selection. Sorts may be performed to organize the output in a user-selected order. In one embodiment, a list of photos may include an embedded query command which may be based on file attributes, image characteristics, and/or photo metadata such as tagged keywords.

U.S. Patent Application Publication No. 20070011138 issued to Boucard et al. on Jan. 11, 2007 for a System And Method For Interactive Data Management discloses articles that may be linked to data including multimedia data. In one embodiment, an identifier identifies an article while the associated pointer identifies one or more locations of all data content associated with the article.

U.S. Patent Application Publication No. 20070156770 issued to Espelien et al. on Jul. 5, 2007 for a System And Method For Controlling And/or Managing Metadata Of Multimedia has metadata with regards to multimedia is made portable with respect to one or more users, terminals, the source, and the provider and/or the content service. Users can share, transfer, transmit and, and/or access the metadata via databases, terminals, servers, and/or networks independent and or separately with respect to the multimedia.

U.S. Patent Application Publication No. 20070208685 issued to Blumenau et al. on Sep. 6, 2007 for Systems And Methods For Infinite Information Organization has client software that provides means to create, edit, maintain, update, revise, modify, and produce metadata enabling categorization and identification of digital assets. The metadata provides tracking, locating, searching, and other features for the disclosed system. When a new digital asset is received, the system may require the end user to provide at least a portion of the metadata/categorization information. Searching/locating operations may be effected on the categorized data. Digital assets may include files, voice mails, instant message logs, e-mails or the like as well as digital asset containers such as folders, directories, disk drives, removable storage media, and the like.

U.S. Patent Application Publication No. 20070260572 issued to Boucard et al. on Nov. 8, 2007 for an Interactive Data Management System discloses an interactive data management system that links an article to files pertaining to the article including text, image, audio, and video data without requiring the user to work through a hierarchical menu structure.

U.S. Pat. No. 6,484,156 issued to Gupta et al. on Nov. 19, 2002 for Accessing Annotations Across Multiple Target Media Streams discloses a system enabling the accessing of annotations across multiple target media streams. An annotation server uses a hierarchical annotations storage structure to maintain correspondence between a plurality of multimedia stream annotations in a hierarchical higher group identifier the annotations corresponding to different multimedia streams can be easily accessed concurrently by referencing the group identifier. The patent defines annotations as data (e.g., audio, text, video, etc.) that corresponds to multimedia presentation. When annotations correspond to multiple different multimedia streams, an annotation server uses a hierarchical annotations storage structure to maintain a correspondence between the annotations and a hierarchical higher group identifier. The annotations corresponding to these different multimedia streams can then be more easily accessed concurrently by using the group identifier. Annotation entries maintained by an annotation server may be made in an annotation metadata store.

U.S. Pat. No. 7,155,676 issued to Land et al. on Dec. 26, 2006 for a System And Method For Multimedia Authoring And Playback discloses more intuitive display control interfaces which are used in a multimedia authoring and playback system. This provides improved authoring of multimedia, websites, and other media-rich content. While some organization is set forth in this disclosure, it generally does not match that set forth in the DAMS system set forth herein.

U.S. Pat. No. 7,167,864 issued to Vasudevan on Jan. 23, 2007 for a Multimedia Inspection Database System (MIDAS) For Dynamic Run-time Data Evaluation discloses substructures in a data set representing physical structures that are assigned to structural groups to facilitate easy access to the data elements which represent the substructures.

U.S. Pat. No. 7,197,493 issued to Ashby et al. on Mar. 27, 2007 for a Collection Management Database Of Arbitrary Schema seeks to provide apparatus and methods for deterministically classifying and indexing objects, such as digital media and files, in a database. Upon establishing descriptive category sets, the user may select objects (such as digital media and files) having attributes perceived by the user to correspond to the descriptive category set. Searching utilities are also included.

While several attempts have been made in the art previously, providing an integrated system having a user-friendly interface that facilitates the manipulation of digital assets on a large-scale basis has generally not been seen until the present inventive system (DAMS).

SUMMARY OF THE INVENTION

In view of the foregoing advantages inherent in the known types of file organizers and media library facilities now present in the prior art, the present invention provides a new method, means, and system by which digital assets can be managed, organized, shared, and exploited wherein the same can be used to make the user's experience better, more friendly, and more manageable.

The general purpose of the present invention, which is described in greater detail below, is to provide a new digital asset management system which has many of the advantages of such media organizers and libraries mentioned heretofore as well as many novel features the results in a new digital asset management system which is not anticipated, rendered obvious, suggested, taught, or even implied by any of the prior art systems, either alone or in any combination thereof.

The Digital Asset Management System (DAMS) of the present invention enables users to store, intuitively organize, share, and enjoy their digital assets (files, e-mails, digital media, and the like) regardless of type with a single, comprehensive solution. Consequently, it becomes much easier for the inexperienced user to readily adapt to the DAMS system as well as enabling the expert to quickly organize and use the increasing amount of digital information that is flooding most individuals of the industrialized world. Additionally, for those who have yet to grasp the astounding depth and richness of available electronic media and information, the DAMS system set forth herein enables them to more readily adjust and to more readily engage a new personal environment where electronic information and communication are available on a worldwide and increasingly instantaneous basis.

The digital asset management system (DAMS) provides an extensive utility for the online management of digital assets such as files including pictures, audio files, video files, and the like. DAMS provides convenient and easily-ascertainable features and operations even for the inexperienced user.

DAMS presents a web-based interface designed to intuitively facilitate use and the important feature of "collections" are represented as icons, such collections being logical collections of items. Overall, there may be considered to be three key tiers: storing, organizing, and sharing of the digital/online assets. Filtering is available to provide subsets of available assets. Tags can be associated with items in order to help with their segregation and/or filtering.

Assets can be dragged or dropped to a buddy, associate, friend, family member, or otherwise, enabling rapid sharing with same. Such assets can be represented by a thumbnail image and the recipient can either download the asset or access it from their DAMS system. Permissions can be set for individual files, assets, and/or collections of assets. Such permissions can be dynamically adjusted or set statically.

Assets can be viewed or reviewed by time and histograms may be used to aid in same. Assets can be identified by their time of creation.

DAMS may "listen" for the addition of any assets with specific tags or properties. Upon discovery or recognition, such assets can be added automatically to one or more collections. Users control whether this occurs automatically, with user approval, or not at all.

"Intellisync," or intelligence synchronization can be provided between home network drives, local PCs, wireless devices, hosts, other home networks, and the like. As set forth in more detail below, mail grabs, e-mail drop boxes, shopping history mail grabs, and additional mail grabs may be created and put to good use.

A confederated "back end" takes multiple disaggregated file systems on the back end and makes these available in a single user interface with file hierarchy. A single logical file system aggregates various and distributed data stores combining what DAMS contains with what it connects to, i.e., attachments in e-mail, files in picture services (such as AOL's picture services), and the like and the DAMS system as a whole can all be managed as a single file system.

Actions and operations may be performed on the user's behalf without his or her (hereinafter, "his") direct action, including: virus scanning, resizing pictures, uploading music, putting files in important folders, podcasting, creating RSS podcasts of public files, auto generation of collections based on usage patterns, etc. A framework is provided for autonomous services that work upon the user's data on his behalf.

With "smart collecting," scanning and autotagging may occur. Clusters of related data may be inspected and aggregated generally according to user preferences and/or, convenience. Most searching is focused on rapidly finding a specific asset. Additionally, finding relations or relationships between user assets may help to create "clusters" of related media and/or data. For example, by looking at a Christmas picture, a cluster of related pictures, music, and documents could be associated with one another all having some relationship to Christmas. This feature provides an experience that focuses on allowing users to "explore" large chunks of their data which in the present day are becoming increasingly voluminous.

DAMS may be built on the Xdrive "Full Integration" project as its foundation. (Full integration accomplishes baseline requirements for global support on AOL or other internetworked systems for members and non-members).

DAMS may include all of the fundamental store, organize, access, share capabilities of current Xdrive (see the related patent applications, above), plus the changes and additions as set forth herein. A user interface with appropriate paradigms and features for digital asset acquisition, organization, use, and sharing may be implemented. A facility for asset meta-tagging and easy re-use of existing tags may be provided. Collections may be auto-added and/or user-added according to logical or other groupings of files. Collections may contain files of any type, and/or other collections. DAMS may "listen" for the addition of any assets with specific tags or properties, and automatically adds those assets to one or more collections. Users control whether this occurs automatically, with user approval, or not at all.

"Shows" are collections of multimedia files that also include specific playback instructions defined by users and recognizable by DAMS' integrated Viewer/Player. Easy to use views, filters, and searching capability for browsing and searching for a) files; b) physical and c) logical collections of files may be provided. Views and filters may harness available metadata that may have been both auto-populated and/or manually populated. User defined compound filters and searches may be saved as new filters for future use.

A capability for tangential navigation of digital assets across tags and through nested/compound filters and views, in any collection or search result may be provided and notification of sharing events via RSS feeds, AOL's Buddy Feeds API or similar, and/or a client-based Toaster may be made.

Anti-virus support may be provided enabling the DAMS to foster peace-of-mind and security through host-based virus scanning performed at the time a user adds new or updated files to DAMS storage. The UI may post warning(s) when a virus-infected file is detected and may present to the user options to repair, delete, or quarantine the file. Quarantined files may be stored but may not be eligible for sharing.

A Synch feature enables anytime, anywhere access to important files, with or without an Internet connection. DAMS may automatically synchronize file additions and changes across a subset of user-identified files/folders on a local PC(s) and the user's host-based storage on DAMS. Once enabled by the user, synchronization may occur automatically in the background whenever an Internet connection is present on the local machine(s).

A backup facility enables users to backup selected folders and files on demand, or on a scheduled basis.

DAMS may read and write its pictures to the same backend system as AOL Pictures or another picture or graphic system. Hence, users with pictures in, for example, the AOL Pictures datastore can easily access their photos in DAMS and vice-versa.

A special e-mail attachment access feature may enable DAMS to capture and store all email attachments sent and received for the user, including AOL and AIM mail (automatically), and for other IMAP and POP3 compliant mail systems (with user configuration). Users may employ pre-configured filters and/or custom-built filters to automatically capture and group specific e-mails and e-mail attachments in DAMS. Such "Mail Grabs" may work seamlessly for users, including AOL mail and AIM mail users. Users on other IMAP or POP3 compliant mail systems may use Mail Grabs after performing limited one-time setup steps. DAMS may ship with two preconfigured Mail Grabs that users may edit as desired: 1) E-mail Dropbox; 2) Shopping History.

The E-mail Dropbox mail grab may copy from e-mail to DAMS any e-mail attachments where the e-mail contains, for example, an AOL-assigned, user-editable "PIN" string in the subject line (e.g., 7892). The user may reset the pin to be no/any string and may treat the PIN as private or share it with buddies as desired. Among its many uses, this functionality is ideal for quickly sending pictures from mobile devices to DAMS.

The Shopping History mail grab may copy from e-mail to DAMS any e-mails that contain specific, editable, order-related words in the subject line, and come from an editable list of the top 100 web retailers.

Users may create and edit additional Mail Grabs to conveniently capture and store e-mail attachments based on any/all of the following filters, including: senders, subject line keywords, and/or attachment types. For example, a user can easily configure a custom Mail Grab and call it "Family Photos," to capture all of the photos from e-mails sent by specific family members.

DAMS' Webgrab technology may enable users to quickly earmark any web destination page or file for addition to the DAMS storage space. Users do not have to download/upload the asset. Instead, users may use Webgrab 1) via a toolbar plugin when surfing the Web, or; 2) through contextual one-click integrations on host or other systems such as AOL and AOL.COM. Users can quickly capture and save for later enjoyment virtually any online promoted content, including web sites and files, "First Listen" and "First Watch" audio/video streams, files in a host or other system such as AOL and other download centers, recipes, etc.

DAMS may integrate with the AOL Address Book back-end system, for example, for contact management tasks, such as sharing of files. Users with an address book (such as AOL or AIM) already in place may enjoy automatic access to that contact information from within DAMS. Users without an address book immediately compatible with DAMS may begin building one, possibly usable on other systems such as AOL Inc. products. Integration with an address book system affords wider benefits due to its ties with other contact management systems, including Plaxo and Outlook.

The UI (user interface) for DAMS will include a "trash can" drop destination for file deletion and recovery (if not purged), which may have been absent from prior Xdrive versions.

In view of the foregoing disadvantages inherent in the known types of digital information and asset management systems now present in the prior art, the present invention provides a digital asset management system wherein filing informational assets can be accessed, distributed, collected, portrayed, and exhibited by a plurality of users in a convenient and attractive fashion.

The general purpose of the present invention, which will be described subsequently in greater detail, is to provide a new digital asset-management system and method which have many of the advantages of prior systems as well as many new and original features which are not anticipated, rendered obvious, suggested, or even implied by any of the prior art systems, either alone or in any combination thereof.

In one embodiment of the present invention, a method for managing digital assets includes the steps of recognizing a new digital asset, determining a tag associated with the digital asset, and associating the digital asset with a collection of digital assets according to the tag. In this way, digital assets with similar tags may be quickly sorted by choosing a filter for the tag.

In another embodiment of the present invention, a method for managing digital assets includes the steps of recognizing a new digital asset (where the digital asset selected from the group including audio files, audio/video media files, digital asset containers, digital media files, directories, disk drives, e-mails, files, folders, instant message logs, pictures, removable storage media, video files, voice mails, webpages, webpage URLs, and combinations thereof), determining a tag associated with the digital asset, and associating the digital asset with a collection of digital assets according to the tag such that digital assets with similar tags may be quickly sorted by choosing a filter for the tag. In this way, the new digital asset is more easily organized and more easily available in the future to a user.

Other embodiments of the present invention are set forth in more detail, below, and the embodiments set forth above are made for purposes of example only and not of limitation.

BRIEF DESCRIPTION OF THE DRAWINGS

FIG. 5 is a graphic and textual representation of the CacheManager.

FIG. 8 is a graphic and textual representation of the AbstractDAO.

Figure 1:
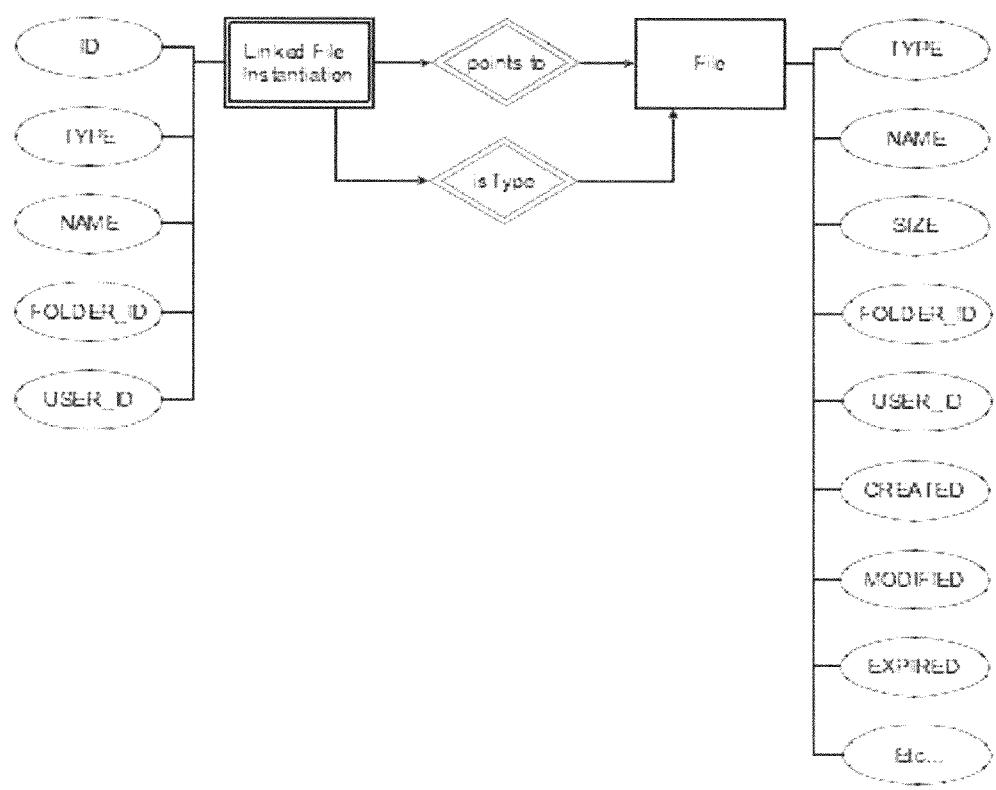
FIG. 1 is a schematic view of a link to a file with its attributes to the file itself with its attributes.

DESCRIPTION OF THE PREFERRED
EMBODIMENT(S)

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

The masculine pronoun is generally used herein to indicate the generic individual and as a matter of convention and convenience.

The present invention resides in a system that enables users to store, intuitively organize, share, and enjoy their digital assets (files, e-mails, digital media, and the like) regardless of type with a single, comprehensive solution. Consequently, it becomes much easier for the inexperienced user to readily adapt to the DAMS system as well as enabling the expert to quickly organize and use the increasing amount of digital information that is flooding most individuals of the industrialized world. Additionally, for those who have yet to grasp the astounding depth and richness of available electronic media and information, the DAMS system set forth herein enables them to more readily adjust and to more readily engage a new personal environment where electronic information and communication are available on a worldwide and increasingly instantaneous basis.

Referring to the drawings, where like numerals of reference designate like elements throughout, it will be noted that the present invention resides in a digital asset management system (DAMS) that enables an individual to manage his or her digital assets online so that such assets are widely available through almost any Internet-accessible device. Furthermore, certain automatic and user-selectable features enable segregation and filtering, directing, and control over incoming and/or outgoing assets. Characteristics and features of such assets may be assigned by the individual or maybe automatically assigned. Similar relationships present between different assets may be recognized and used to "cluster" or collect such assets into collections or shows.

By unburdening the individual of the management of increasingly-voluminous data assets, as well as allowing the user to share such assets with an increasingly-growing number of friends and acquaintances known personally or online, the DAMS system creates a unique user experience that is highly desirable as it allows the user to achieve his or her ends with increasingly minimal required interaction.

Note shall be taken that the use of any verb tense herein (such as the present tense ("is"), future tense ("will be"), imperative tense ("must"), etc.) is for exemplary purposes only and shall be interpreted to include the conditional tense and/or its analogs ("may," "could," etc.) as appropriate or reasonable. The use of such conditional terms and/or analogs shall be interpreted as providing optional operations, events, or conditions. The use of the affirmative, instructional, and/or imperative voices for conveying the disclosure herein may also be intended to include the conditional ("may") voice regarding the relevant action or condition and vice-versa. Reference to "AOL," "AIM," and other specific providers and/or services is exemplary only and is intended to convey a specific example of more generic service providers or services, as relevant and/or as according to context. Such references are to be interpreted as to include the generic as well as the specific.

The digital asset management system ("DAMS") is generally built on the Xdrive system (see related patents and the potential related documents incorporated by reference, above) as its foundation. Other Internet storage systems may also be used to good effect and are contemplated as possible adjuncts or foundations for the DAMS. Full integration accomplishes baseline requirements for global support on host systems for members and non-members. The DAMS includes all of the fundamental store, organizational, accessible, and share capabilities of the Xdrive system, plus the changes and additions as set forth herein. A user interface with appropriate paradigms and features for digital asset acquisition, organization, use, and sharing are provided as is a facility for asset meta-tagging and easy re-use of existing tags. Auto-added and user-added logical groupings of files, "collections" may contain files of any type, and/or other collections. DAMS "listens" for the addition of any assets with specific tags or properties, and may automatically add those assets to one or more collections. The user may control this whether automatically, with user approval, or not at all. Collections of multimedia files can be assembled into "shows" that also may include specific playback instructions defined by users and recognizable by DAMS' integrated Viewer/Player. Easy to use "views," "filters," and searching capability for browsing and searching for files and their physical and logical collections of files. Views and filters may harness available metadata that has been both auto-populated and/or manually populated. User defined compound filters and searches may be saved as new filters for future use. DAMS ("the system") enables tangential navigation of digital assets across tags and through nested/compound filters and views in any collection or search result so that users have access to their data although minimal information identifying the date is remembered, or otherwise.

The system enables sharing events via RSS feeds and provides anti-virus support. DAMS fosters peace-of-mind and security through host-based virus scanning, performed at the time a user adds new or updated files to the system storage. A user interface ("UI") posts warnings when a virus-infected file may be detected and presents user options to repair, delete, or quarantine the file. Quarantined files may be stored but may not be eligible for sharing.

There is access to files, anytime or anywhere, with or without an Internet connection provided as DAMS that automatically synchronizes the file additions and changes across a subset of user-identified files/folders on one or more local PC(s) and on the user's host-based storage on DAMS. Once enabled by the user, synchronization may occur automatically in the background whenever an Internet connection may be present on the local machine(s).

The system enables users to backup selected folders and files on demand, or on a scheduled basis. DAMS may read and write its pictures to the same backend system as AOL Pictures or other visual systems. Hence, users with pictures in an AOL Pictures or other datastore may easily access their photos in DAMS and vice-versa.

DAMS, like media datestores such as AOL Pictures, may feature unlimited photo storage. DAMS may capture and store all email attachments sent and received for email, such as AOL and AIM mail, automatically and may perform similarly for other IMAP and POP3 compliant mail systems with user configuration. Users may employ AOL-configured or other configured filters and custom-built filters to automatically capture and group specific e-mails and e-mail attachments in DAMS. "Mail Grabs" may work seamlessly for email users, including AOL mail and AIM mail users. Users on other IMAP or POP3 compliant mail systems may use Mail Grabs after performing limited one-time setup steps. For example, DAMS may ship with two preconfigured Mail Grabs that users may edit as desired: 1) E-mail Dropbox; 2) Shopping History. The E-mail Dropbox copies from e-mail to DAMS any e-mail attachments where the e-mail contains, for example, an AOL-assigned, user-editable "PIN" string in the subject line (e.g., 7892). The user may reset the pin to be no/any string, and may treat the PIN as private or share it with buddies as desired. Among its many uses, this functionality may be ideal for quickly sending pictures from mobile assets such as cell phone to DAMS. The Shopping History mail grab may copy from e-mail to DAMS any e-mails that contain specific, editable, order-related words in the subject line and may come from, for example, an editable list of the top 100 web retailers.

Users may create and edit additional Mail Grabs to conveniently capture and store e-mail attachments based on any/all of the following exemplary filters: senders, subject line keywords, and attachment types. For example, a user may easily configure a custom Mail Grab and call it "Family Photos," to capture all of the photos from e-mails sent by specific family members.

DAMS' "Webgrab" technology enables users to quickly earmark any web destination page or file for addition to DAMS storage space. Users do not have to download/upload the asset. Users may use Webgrab 1) via a toolbar plugin when surfing the Web, or 2) through contextual one-click integrations on a host or other system such as AOL and AOL.COM. Users may quickly capture and save for later enjoyment virtually any online promoted content, including web sites and files, "First Listen," "First Watch" and/or other audio/video streams, files in AOL and other host/download centers, recipes, etc. DAMS may integrate with the AOL or other Address Book backend system(s) for contact management tasks, such as sharing of files. For example, users with an AOL Address Book (AOL or AIM) already in place may enjoy automatic access to that contact information from within DAMS. Users without an AOL/AIM Address Book may begin building one, usable in other AOL Inc. products, by using DAMS. Integration with the AOL Address Book system affords wider benefits, due to its ties with other contact management systems, including Plaxo and Outlook. The UI (user interface) for DAMS may include a "trash can" drop destination for the file deletion and recovery (if not purged), which has been absent from prior Xdrive versions.

The present system may integrate with an existing host system at several points, including, for example, AOL/AIM Mail, and copy attachments from a mail system, including an IMAP. For Non-AOL/Non-AIM Mail, copying attachments from mail IMAP or POP3-compliant services may occur. Other available events include: read/write from/to AOL Pictures or other datastore using AOL Pictures or other API; read/write from/to AOL Address Book backend via AB or other API; integration with McAfee host-based scanning engine under AOL license; integration with 3rd party synch engine(s); integration with AOL or other client (WAOL, Copland, Frontier) via client-added button/icon on all client windows; integration with AOL.COM or other host via button/icon in hat/foot navigation; integration with AOL or other Browser via toolbar item; and integration with I.E., Netscape, Safari browsers via downloadable toolbar plugin.

The present system may support basic capabilities for the following (and other) mobile functions using the browsing software of leading handheld devices including: search, browse, send file (P3), fax file, upload file, and download file. Platform support may include: P1—Series 60 Symbian based, P2—Java, P3—BREW, and P4—Microsoft Mobile platforms.

The present system may provide a Web-based user interface and a client-based user interface. The web interface may be the primary interface providing anywhere access to all DAMS functions except those that require client presence. The client interface may generally have a consistent design/feel as the Web UI. Its feature set may not be the same as the web version. Instead, it may be focused on the use of the client to mount physical storage as a drive recognized by OS, and/or use of client on local machine to perform sync to/from that machine. The use of a client on local machine may occur to perform backups/restores to/from that machine. The present system may provide the download and installment of a toolbar plugin required to use Webgrab via the browser toolbar as well as providing the Sharing Notifications.

Users may add and remove supported AOL and 3rd party modules (tools, views) from the interface palette to make the UI as streamlined or complex as the user wants and to perform the functions the user desires. In each page or view, the UI may make available to the user those tools and modules that may be contextually supported for the use on that page or view. The interface may dynamically resize all open panels when the user opens or closes the panels. The user may override the automatic resizing of panels and manually resize panels within UI-set upper and lower limit size boundaries. Such panels may open to a state existing as when they were closed. When the user opens and/or signs-in to DAMS, they may find the product as they last left it with the same modules displayed.

Dragging and dropping may be supported (in addition to cut/copy/paste) for functions such as moving, grouping, and tagging files and collections.

Files and collections may be presented by default as objects rather than textual labels and lists. An exception may occur when viewing physical structures of files (e.g., synched files, backed-up files) as these listings may be presented in the traditional file/folder view to match the structure of their source.

DAMS may support "single sign-on" to DAMS for host systems such as AOL, AIM, and AOL.COM or other registered users with no need to sign on separately to DAMS if already a registered DAMS user is already signed on to the AOL host or other host complex.

When DAMS may be bundled as part of another product (e.g., AOL Service "Streamliner" release), users may not need to complete a standard registration flow to use the product. Rather, each user may be provisioned at the time of their first attempted use of DAMS or an embedded DAMS feature (e.g., Webgrab). For example, for AOL Streamliner: DAMS may automatically provision storage space (possibly for a fee) and then automatically sign-in to DAMS each AOL Access screen name that fulfills all of the criteria for establishing a "Family Plan." For Example, the user may be online and authenticated using the AOL Streamliner client and visits DAMS through any means (promotional link, advertisement, types URL in browser, etc.) The user may not be yet a DAMS registered user, but may be classified as premium services billing (PSB) enabled so they may be known to be eligible for later service upgrade. The user may be classified as a general/18+ screen name or may be a master or designated master screen name (so they may administer the provisioned "Family Plan" storage to their eligible subaccount screen names.) The user may also be a screen name within an account that does not yet have another master or designed master account already registered for DAMS. All necessary information to provision DAMS account for the user may be sent server-to-server on the backend and the account may be accessible to the user. If a bundled user may be attempting to add one or more file(s) to DAMS and their DAMS account may not be yet provisioned, the file(s) upload process may start in parallel with the provisioning (e.g., upload to a holding area until provisioning may be completed, and then migrate the files to the provisioned space).

Naming standards for all web interface pages may follow current AOL or other Search Engine Optimization guidelines.

The UI (user interface) may include an IAB (Internet Architecture Board) standard sized promotional area in the main asset view module that may be used for either advertising or for AOL or other promotions (e.g., special deals, bundles, notices) The promo block may be updateable on a country by country basis and may allow for serving of different promos based on the user's statutes, condition, or what access the user has. The system allows for serving of different promos or ads based on whether the user may be a paying subscriber (e.g., serve a promo) versus a free user (e.g., serve an ad).

"Shows" may be logical multimedia combinations of files (visual and/or audio), plus additional data that tells a DAMS integrated viewer/player how to play the show (e.g., what images and/or sound to show, in what order, and with what delay.) The system supports creation, edit, storage, sharing, and playback of such Shows.

"Collections" may be logical groupings of files. All files in a collection automatically inherit the association of the name of the collection for as long as they remain part of the collection. When a user deletes an asset from a collection, the asset may be merely removed from that collection, but still remains in the user's DAMS storage. Collections may contain other Collections and/or Shows. When the user uploads a folder via any method (manual, backup, synch, or otherwise) a Collection with the same name and file/collection contents may be automatically created.

The system allows users to search for files, collections, and shows, using multiple criteria and standard operators. Searches may generate results comprised of files, collections or shows. Results may be provided where the search term matches all/part of an asset name, or where the search term matches a metadata tag for an asset, whether that tag/attribution was applied automatically or manually. Users may have the option of searching all of their assets, or, optionally, searching within an already refined/filtered view of their assets. The user's DAMS assets may be indexed on the host allowing rapid return of search results. Full-text search including the body of documents may also be supported. The process may be akin to a "desktop search," except that it searches the host. An integrated search for local and hosted files plus the Web, presented in a single UI with 3 separate areas, i.e., "search my everything" may be made available. Users may save searches, apply a name to a saved search, and quickly select and apply a saved search to be executed again.

The system allows users to browse their DAMS assets using combinations of filters and sort criteria.

The DAMS may provide the following categories of prepared filters, based on populated meta-data, allowing users to narrow or widen the displayed result set of assets stored in DAMS: all DAMS, file type, source/origin, tags (including general), people tags, place tags, event tags, and ratings. At a high-level, the filters in each category may be as follows: all DAMS unfiltered view or otherwise, and file types, including pictures, videos, music, text/other. Searches based on source/origin may include: webgrabs, e-mail, DAMS sharing, e-mail dropbox, shopping history, custom e-mail filters, synched sources, backed-up sources, manually uploaded sources. Tags may be defined or implemented with: "Tabs—General" being a default location for all tags. People Tags may be auto-populated with contact names from e-mail attachment and DAMS sharing activities. People tags include user-added tags that the user has categorized as "people" by manually dragging the tag(s) from "Tags—General" to "People Tags." This dragging action moves the selected tag(s) from "Tags—General," into "People Tags." Generally, each tag may only exist in one tag category so that contradicting logic cannot be introduced when a user sets multiple filters.

"Place Tags" may include user-added tags that the user has categorized as a "place" by manually dragging the tag(s) from "Tags—General" to "Place Tags."

"Event Tags" may include user-added tags that the user has categorized as an "event" by manually dragging the tag(s) from "Tags—General" to "Event Tags."

A rating may include user-designated ratings of 1 through 5 stars that the user may optionally apply to any asset.

Filter categories may expand when clicked to reveal specific filters (e.g., People Tags may reveal specific people by name such as Jane Doe, Bill Jones, Doug@Yahoo.com, etc. File Types may reveal specific file type categories, such as Pictures, Videos, etc.). Users may click to toggle each applied filter on or off and users may apply one or more filters in one or more filter categories, simultaneously. As one or more filter categories may be applied, results meeting all of the selected categories may be displayed immediately. (e.g., User choosing filters on File Type: Pictures, and People Tags: Jane, may see a result set including pictures with the "Jane" tag only.) When a user applies more than one filter within a filter category, the results may bring back results that meet any of the selected filters in that category. (e.g., User choosing Filter Category: People Tags, and then selecting filter "Jane" and filter "Bob" may see a result set including all objects tagged as either "Jane" or "Bob").

An unfiltered view of all assets in DAMS may be provided. This view may not be blended with other filters. If the user chooses this view, any previously applied, active filters may be automatically removed.

When a user filters by file type, clicking on the File Types category may reveal a list of file type filters. Each filter may be a major file type grouping, such as: Pictures, Video, Music, Text/Other, etc. The Pictures category may display only assets spanning major image file types. The DAMS may read and write its pictures at full resolution to the same backend system as may be provided, such as by AOL Pictures. For example, users with pictures in the AOL Pictures datastore may easily access their photos in DAMS and vice-versa. To minimize user confusion about what happens when they delete a picture, DAMS pictures may be displayed within AOL Pictures as their own category, e.g., "My Albums" (just as AOL Journals has a carved-out area in AOL Pictures for "My Journal Albums"). Similarly, by default, AOL Pictures' existing albums may be displayed as collections within an "AOL Pictures" collection in DAMS. The user may subsequently copy any picture from the "AOL Pictures" collection to a different collection outside of the AOL Pictures collection, if they wish, as a separate logical copy.

For video, display may be made only of assets spanning major video file types. The Music category displays only assets spanning major music file types. For the Text/Other category, the display includes file types, or display assets, not included in the Pictures, Videos, and Music groupings.

Clicking on the Sources Filter category reveals a list of source filters. Each filter represents a means by which DAMS storage may be populated (the source may be an auto-added tag on the asset), as follows: Webgrabs, E-mails, DAMS Sharing, Email Dropbox (contains e-mail attachments gathered together within DAMS, based on subject line criteria), Shopping History (contains shopping-related e-mails culled and copied automatically to DAMS, based on subject line and sender criteria) Custom E-mailed Source (up to 3, for example) (and may contain e-mail attachments gathered together within DAMS, based on subject line, sender, and attachment file type criteria), Synched Source (e.g., up to 3), Backed-up Source (e.g., up to 3), and Manual uploads, among others.

Webgrabs display assets that entered DAMS via a webgrab. The source tag "webgrab" may be auto-added to the asset when it enters DAMS storage. DAMS' Webgrab technology enables users to quickly earmark any web destination page or file for addition to DAMS storage space. Users do not have to download/upload the asset. Users may quickly capture and save for later enjoyment virtually any online promoted content, including any web site, URL-referenced files, "First Listen," "First Watch," and/or other audio/video streams, files in download centers, recipes, etc.

Users may use Webgrab 1) via a toolbar plugin when surfing the Web; and 2) through contextual one-click integrations on AOL and AOL.COM (in discussions with Access and Audience). The toolbar plugin may be delivered with DAMS client download. When clicked, DAMS' toolbar icon may open to reveal the following options: a) Save page to DAMS (saves actual HTTP references of all component files, akin to Internet Explorer's (IE's) FILE→SAVE AS command); b) Text entry box for Save file to DAMS webgrab allows user to enter or paste http-referenced file address. The Webgrab area in DAMS may include a link to instructions for any web site administrator to add Webgrab buttons to their site. Webgrabbed pages may appear as collections in DAMS, and each Webgrabbed collection may be automatically placed within a single high-level "All Webgrabs" collection to prevent an overflow of collections in the default user view. The visual object of each webgrabbed collection may be a thumbnail image of the webpage in DAMS' default object-based view. The relevant URLS may serve as their names. The names may be auto-edited to append an incrementing number in the event that a given URL may be webgrabbed more than once. When opened in DAMS, Webgrab collections may include each webpage's component http asset files, and a file for the fully-assembled page.

When a filter is applied to email sources, display may be made of assets that entered DAMS from E-Mail accounts. All e-mail attachments sent to and from the user may be automatically saved to DAMS. The user may turn automatic email attachment capture off/on as desired. The default may be on. When DAMS pulls an e-mail attachment into its storage, it does not mean the user has read the e-mail. It does not communicate to the host e-mail system that the e-mail was read. Therefore, the email remains as "new" email in the user's email system until it may be read using a supported e-mail client.

If the user is a local (to the host) system email user, e.g., be an AOL or AIM user, their AOL or AIM e-mail account may be accessed automatically to pull email attachments. All users (AOL, AIM, or Other) may, optionally, provide configuration info to DAMS in order to automatically connect to any other (non-AOL, non-AIM) e-mail account, provided it may be a IMAP or POP3 email account. For AOL or AIM users, this may be instead of or in addition to their AOL/AIM e-mail account (so they would not exceed the one-email-account per user limit). The UI features an e-mail configuration function to support this setup, requiring the user to supply all necessary information to access the non-AOL account.

AOL or AIM users may also direct DAMS to draw from a non-AOL e-mail account in addition to their AOL or AIM account.

Attachments may be auto-tagged with the Source attribution "AOL E-mail" or "AIM E-Mail" or "<Other> E-mail." They may also be auto-tagged with a "People" attribution in the form of the name of the sender. The email subject line text and body text may be auto-added to the saved document or collection as additional "Source" metadata.

When DAMS sharing is filtered, it displays assets that entered DAMS by being shared to the user through DAMS, and/or by another DAMS user. DAMS shared items may be auto-tagged with the Source attribution, e.g., "DAMS Sharing" may be auto-tagged with the "People" attribution, such as the sender's name, The subject, and the message (if any) from the sender may also be auto-added to the saved file or collection as additional "Source" metadata.

When the E-mail dropbox is filtered, the results contain e-mails with attachments that have been gathered together within DAMS into this "dropbox" group due to the presence of a specific string in the email subject line. A source tag such as "e-mail dropbox" may be auto-added to the asset. The E-mail dropbox feature pulls from the same e-mail account(s) as the e-mail sources (described above). However, the e-mail dropbox feature continues to function even if the user has turned off the e-mail attachment gathering function. The user controls how they or others may send things to their e-mail drop box via a user controlled filter string (default set in DAMS, and user editable) and via their existing mail system spam controls (set outside of DAMS). The subject of the email may include the user's dropbox filter string for the asset to land in the Dropbox. The filter string may be prepopulated in DAMS out of the box as a random 4 digit numerical string. The string may be displayed to the signed-in user when they click on the Email Dropbox filter. The user may change their filter string to be any string that may fit in the e-mail subject or to be null (if no filter string then every mail may be copied into the dropbox). The user may invite others to populate their dropbox by merely telling them their "secret" string (if any). The e-mail attachments retain their names, and may be auto-tagged with the sender name as a "People" tag. The email subject line text and body text may also be retained as source metadata.

A user's Shopping History may be filtered with the results containing shopping-related e-mails culled and copied automatically to DAMS, based on subject line and sender criteria. The assets displayed may be saved from e-mail as documents. These assets fulfill specific criteria to be considered part of Shopping History. The tag "Shopping History" may be auto-added to the asset when it enters DAMS storage. Emails may be saved as documents in Shopping History when they fulfill criteria such as the following: the subject line contains specific shopping oriented words in the subject line (e.g., order, invoice, shipment, shipping, etc.) AND/or Senders from one of the top 100 known vendors (prepopulated, and based on e-mail ops whitelists). This list may be customized in each country. The subject line criteria may be editable by the user to add or delete subject words and the sender list criteria may be editable by the user to add or delete sender addresses. Shopping History may be positioned in the UI as an "example" filter only, that the users may edit completely, and even rename it to have a totally different function if desired. The service provider (such as AOL) may not maintain or update the sender list after the release.

Custom E-Mail Filters may provide results that contain e-mail attachments already pulled into DAMS, but subsequently grouped together based on such things as subject line, sender, and attachment file type criteria. Users may configure several Custom E-mail Filters. Users may name each filter. Users may define "Includes" and "Excludes" based on any/all of: Subject terms Senders Attachment file type (choose from among Pictures, Video, Music, Text/Other) and otherwise. For example, a user could build a custom E-mail Filter called "Pictures From Family." The subject terms could be unfiltered. The senders would be the 6 e-mail addresses of the people in their family. The attachment file types would be "Pictures" and "Video."

For Synched Uploads, users may be allowed to configure several upload sources. During synch setup using the Synch tool (described later), users may name each synched source, e.g., Mary's Computer, Work laptop, Vacation Home PC, etc. The source tag, e.g., "Mary's Computer—Synched," may be auto-added to the asset when it enters DAMS storage. The source tag naming convention may indicate both the source name (Mary's Computer) and the method by which the assets reached DAMS (Synch).

For filters applied to Backups, users may configure several backed-up sources. During Backup setup using the Backup tool (described later), users may name each backed-up source, e.g., Joe's Computer, or Office PC, or Bill's. The source tag, e.g., "Joe's Computer—Backup" (for the first one) may be auto-added to the asset when it enters DAMS storage. The source tag naming convention may indicate both the source name (Joe's Computer) and the method by which the assets reached DAMS (Backup).

When one or more filter(s) are applied to Manual Uploads, displayed assets that enter DAMS via manual upload, include a source tag "manual upload" that is auto-added to the asset when it enters DAMS storage.

For a filter designating Tags—General, this may be an alphabetical listing of all tags for all assets. There may be some exceptions in that Tags that a user drags out of "Tags—General" and into one of the other tag categories (People, Places, Events) may not be caught by the filter. Tags for people that may be auto-populated due to email attachment receipt or DAMS sharing activities may reside by default in the People category and not in the "Tags—General" category. Generally, each tag exists in only one tag category, either Tags—General, People, Places, or Events. Individual tags or groups of selected tags may be moved (dragged) from one category to another without restriction.

When a filter is applied for the People category, clicking on the people category may provide a list of tags with the names of people, appearing as email addresses or friendly names (more below). Each name may serve as a filter and the names in the list may come from the following sources: e-mail senders/recipients—people (addresses) on the e-mail host with which the user has exchanged one or more files; DAMS Senders/recipients—people, or addresses, with which the user has exchanged one or more assets using DAMS (only where the asset may be still present in DAMS); other people—people manually added by the user. Manually added names (items tagged under the "people" category) appear as entered by the user. Automatically-added names may appear as e-mail addresses unless the user has associated a "friendly name" with that e-mail in their DAMS contacts (DAMS contacts may be integrated with the AOL Address Book backend, which already supports friendly names).

If a person in this list has multiple e-mail addresses they may appear multiple times in the people list, unless the user populates the address book with the alternate e-mail addresses under a single Address Book/contacts entry (which may be supported by a current AOL Address Book backend schema with which DAMS may be integrating). In that case, the multiple e-mail addresses may map to a single "person" in the person view.

Clicking on any one or more of the name(s) displays DAMS results for that name(s), which may include: All e-mail attachments received from that person (provided the asset may be still in the recipient's DAMS storage); and/or all e-mail attachments sent to that person (provided the asset may be still in the sender's DAMS storage); all assets received from that person via DAMS share events (provided the asset may be still in the recipient's DAMS storage). The auto-generated people tag may remain persistent even if the asset was renamed by the recipient. All assets sent to that person via DAMS share events (provided the asset may be still in the sender's DAMS storage) and also indicated as may be any additional assets that the user has manually associated to that "person" by adding that people tag to it.

Clicking on the "places" filter category may provide a list of place filters. These "places" may be tags that the user has categorized as being places and applied to one or more assets in DAMS.

Clicking on the "events" filter category may provide a list of events filters. These "events" may be tags that the user has categorized as being events and applied to one or more assets in DAMS. "Places" and "Events" may be populated differently than "People" as it difficult to auto-tag assets with a universally agreeable "place" and "event" tags, unlike "people" tags which may be objective based on actual sharing behavior. For example, if a user uploads files on December 25, it may be assuming too much to automatically tag the assets as "Christmas" and listed them within "Events." Christmas may not be observed by all. Indeed, maybe the assets had nothing to do with Christmas. In contrast, if Jane shares an asset with user Bill via DAMS or via e-mail, we know that the sharing occurred, that the asset may be auto-tagged "Jane," and that sender Jane (like any sender or recipient) may be represented in Bill's "People" filter.

Clicking on the "rating" filter category may provide the five star ratings: 1 star, 2 stars, 3 stars, 4 stars, and 5 stars. These Star Ratings may be a form of tag that the user has applied to one or more assets in DAMS.

Collections may be arbitrarily labeled groupings of assets. They may contain logical references to Files, other Collections, and/or Shows. Collections may not be tags as tags may be attributions for assets. Collections may be manually built or automatically generated. Automatically generated collections may include: Webgrab collections which may be automatically generated inside a single, system generated; and/or overall "All Webgrabs" collection Uploaded folders which may be automatically turned into Collections with the same name as the folder. Manually created Collections may be arbitrarily named by the user, typically with an intuitive, thematic name, e.g., "Robbie's Birthday," "Skiing Utah 2006," "Favorite Roses," etc.

Just as users may click on DAMS' filters to display results filtered by metadata and tags, users may also click on Collections to view the collection's contents. When viewing a collection's contents, the user may refine the contents displayed using search and/or sort criteria. This may be particularly useful for collections containing a large number of assets. Collections, like individual files, may be attributed with one or more tags under one or more categories of General, People, Places, or Events. When a user clicks, or acts/chooses, to create a collection, they may be prompted to name it. The individual assets placed in the collection may be associated with the collection name, and this relationship (collections in which the asset exists) is surfaced, or applied, in other views such as the Info view of an individual asset. Users may apply tags to a collection, if desired, just as they may apply tags to any individual asset. However, the individual assets in the collection may not automatically inherit any General/People/Place/Event tags that the user may have elected to apply to the collection itself.

Users may add files, shows, and other Collections to Collections by merely dragging these assets and dropping them onto a specific Collection. In the default DAMS view which display assets as visual objects, users may define what appears as the front-face of a collection. Users may select a visual file in the collection (picture or still of video) to be thumbnailed and serve as the face (or identifying visual image) of the collection. Alternatively, the user may choose from a list of canned symbols to serve as the front face (similar to an approach for the AOL 9.0 carousel toolbar icons). If the user does not make a choice, then a default symbol may appear that may be unique to collections. All collections may have some kind of visual treatment to convey to users that they may be targets for dragging and dropping other assets.

All collections may have some kind of visual treatment to visually convey to users the proportional asset makeup of the collection, by file/object type, e.g., Pictures, Music, Videos, Text/Other, Other Collections, Shows. AOL-populated and/or service-provider-populated collections may have a UI that includes an AOL-populated collection which may (in turn) contain other collections and files within collections. The files may include tax forms, ebooks, movie trailer streams, or any other promotional content that AOL wishes to make available. The contents of these collections may be promoted as part of search engine marketing campaigns in order to drive traffic to DAMS and stimulate user trial of the product. The pre-populated collections may be read-only for all users. The contents may be established and edited only by selected host staff. The host or AOL-populated collections may provide AOL's marketing teams with the ability to populate varying content for different kinds of users, i.e., AOL members and/or; Users with screennames who may not be AOL members and/or; the rest of world (users who may not be AOL members and may not have screen names.)

"Smart Collecting" occurs when DAMS "listens" for and/or detects the addition in DAMS of any asset with a specific tag or metadata properties and then automatically adds the asset to one or more Collections. Users generally have control over how and whether Smart Collecting occurs. DAMS may support two forms of Smart Collecting: User Directed (where the User stipulates that assets with specified tags always get added to specified Collections) or Automatic (where DAMS recognizes a historical pattern of tagging and collecting, and, with user consent, starts performing it automatically).

The following is an example of user-directed smart collecting: Joe likes to garden. He collects photos and tips (documents and webgrabs) related to gardening. Joe creates a Collection in DAMS called "Gardening." Joe clicks a button within the Collection to setup the Collection for Smart Collecting. Joe enters a list of tags: lettuce, corn, peas, carrots, garden, lawn, hedge, hush. He saves the list. This tells DAMS that whenever an asset may be tagged with one of the tags in the list, the asset may be auto-added to the "Gardening" Collection.

As an example of automatic smart collecting, suppose Mary loves collecting photos of her kids. Mary creates a Collection called "Kids Photos." On Monday, Mary receives a photo of her son Billy from a neighbor. Mary tags the photo with the word. "Billy" and drags it into the "Kids Photos" Collection. On Tuesday, Mary receives a photo of Billy taken by Grandma. Mary tags the photo with the word "Billy." DAMS automatically prompts Mary with a Smart Collecting dialog box: "Would you like to add this item to the "Kids Photos" Collection?" Mary sees options below the message: "Yes" and "No." Each may be coupled with preference checkboxes. Action "Yes" may have two options. Option 1 with Yes could be always add items with this tag to this Collection(s). Option 2 with Yes could always ask me before adding items with this tag to this Collection Action. No Option 1 could be "Not this time." Option 2 with No could be "don't offer to do Smart Collecting again." For this example. Mary chooses Yes with Option 1.

When she opens the collection days later, she notices the Smart Collecting Preferences button in it. She recognizes that this may be where she would click if she wanted to change her Automatic Smart Collecting settings.

Smart Collecting Settings are generally present for: every collection each of which contains a button/link to setup its Smart Collecting settings. Clicking it accesses a panel with options, including, among others: List of all tags currently represented in the Collection; List of tags subject to Smart Collecting (user may drag tags from the all-tags list into the Smart Collecting list), Radio buttons beside each Smart Collecting tag (1) Automatic; 2) Prompt me); Options to mark all "Automatic" or mark all "Prompt Me"; Delete and Delete All functions (users may highlight one, several, or all tags in the Smart Collecting area and delete them from the Smart Collecting list); Smart Collecting Options Beyond Tags to enable adding one or more Smart Collecting criteria based on file properties or otherwise such as Date Created (User sets range, for example, a Smart Collection called "Gardening 2004"), Date Uploaded (User sets range), File Type (User selects one or more type(s), for example, a: Smart Collection called "Gardening Photos 2004.")

Users may be able to sort DAMS stored results of any search or filtered result set using almost any criteria including any one of the following criteria: Name (alphabetical), Date created (for images this may be the date the photo was shot, if available), Date uploaded, Most recently accessed, Most often accessed, and/or Rating (highest/lowest based on 1-5 star rating system).

The user may choose to display results of searches/browsing in many ways, including any one of the following ways. For Objects (default), the system displays assets as small visual objects. Picture and video files may display an image of the picture or first frame of video. Other file types may be represented as objects with system-generated descriptor symbols, such as a musical note for music files. For Lists, the system provides textual lists of asset names with info for each item indicating whether the item may be a file, collection, or show. For a Timeline, a chronological histogram of the user's assets is displayed. The user may scroll a slider mechanism to zoom in on specific dates or zoom out to broad date ranges. The user may click within the histogram to view more specific results.

DAMS may provide a separate view of actual physical assets stored in DAMS (no logical collections included) in a familiar file/folder structure that is searchable and sortable. The physical storage may be searchable, sortable, and filterable by File Type (e.g., Show me pictures only) and/or source/origin (e.g., show the user the physical view of assets from a specific synched computer only). The physical storage view may not be filterable as by the General/People/Places/Events//Ratings filters. These filters may be only available in the logical view of DAMS assets DAMS may allow users to create multimedia "Shows," including slideshows, with or without music, video shows, playlists, and other multimedia combinations. Audio playlists may be enjoyed using DAMS' integrated player or other players that support standard audio playlist formats. Other shows which may lack an industry standard for playback may be enjoyed by a DAMS user, and shared with others via DAMS. Users and Share recipients may be required to use DAMS integrated player to view/play shows. The "Create a Show" function may be available as an option for any Collection. When the user selects "Create a Show," they may be presented with options to setup the visual parts of the show (if applicable) and the audio parts of the show (if applicable). For the visual setup, the user may choose which items to display (if applicable); choose what order to display them in (if applicable); and choose number of seconds delay between each item (if applicable) (0-60). Supported items include image files, video files and/or other documents. For the audio setup, the user may choose which items to play (if applicable); choose what order to play them in (if applicable); and choose the number of seconds delay between each item (if applicable). Supported audio items include: audio files, video files, and/or Audio Playlists.

The "Save" command saves the show as a separate collection, but gives it a visual/icon that may be distinct to shows. The saved Show may be a collection containing all of the assets in the show, plus an additional file of instructions that tells a DAMS player the playback instructions stipulated during the create-a-show process. Audio playlists may also be saved as Shows, but with a visual treatment distinct to audio playlists.

DAMS may include a clipboard feature to serve as a staging area for assets. Users may drag and drop items onto the clipboard. This is useful, for example, while processing items to place in a collection. Users may drag and drop one or more items from the clipboard to any other valid destination including a collection or a tag. Items disappear from the clipboard after they may be dragged to any other valid destination. Users may clear items from the clipboard. Clearing merely removes the item from the clipboard. It does not delete the item or any of its associations. Placing an item on the clipboard does not change any of its existing metadata, associations, or physical storage information. Items placed on the clipboard may not be affected by any filtering the user may be doing to find other assets. When the user closes their DAMS session, users may be warned if there may be still items on the clipboard, and given the option to cancel the close exit action, or to clear the clipboard contents and close the product.

The DAMS UI may offer a Random Memory Generator module. At the click of a button, the UI may surface, or present, in that module a randomly selected Picture asset from the user's storage. The picture may be displayed significantly larger than a thumbnail, but not full screen, so that the user may choose to run the Memory Generator module alone on their desktop or beside other applications. Via the cursor hovering over or buttons on the module, the module may offer the standard function options for each picture that may be offered for all assets (see Common Functions for Each Asset below), plus options to Share (invokes Contacts/Share module) and Tag (invokes tagging module). The module may include functions that allow the user to: refresh the images as a slideshow with user-set delay in seconds, possibly from 5 to 30. This function pauses if the user selects an action to perform on the picture, and may be restarted manually by the user after pausing. Other module functions may include, generating a new random image on demand and restricting the Memory Generator to pull from a specific selected collection(s) and/or tag(s).

There may be common functions for each asset. For example, with the feature of Viewing/Playing assets in DAMS, the integrated viewer/player DAMS may include an integrated Viewer/Player capable of displaying/playing most major file types spanning Music, Photos, Videos, and Documents, without requiring the user to open the native application of the file. In the event that the file type cannot be viewed/played, DAMS may post a message offering to Open the file instead, in the proper/default application as determined by the OS. When mousing-over a file, show, or collection, the UI may surface, or present, an option to preview it full-screen. The Preview option may also be supported by a right click mouse option. If the user clicks to Preview, DAMS integrated viewer/player may open to full size, displaying the asset. For collections, it may display/play the first file in the collection. If the file is a song, video, or show, the file may be queued to play but may await the user's click on the play (>) symbol to begin playback. Standard playback controls for Stop and Pause may also be included. If the Preview option was invoked from a collection, or from a file within a specific collection, then the viewer/player may include Next/Previous ("next/prev") navigations to display/play the other files in the collection. The user may close the viewer/player with one click.

DAMS may include an "Open" function that opens a file in its native application for full read/write capabilities. When mousing-over a file, the UI may surface, or present, an option to Open it. When right-clicking a file, the UI may surface, or present, an option to open it. The file opened may be the actual file on the host, so that any changes to the file made in the native application may be default saved back to the host such a capability may also exist for remote or web folders.

DAMS may include a "Delete" function that sends the asset to the Trash Can. When mousing-over or right-clicking an asset, the UI may surface, or present, an option to Delete it.

DAMS may include an "info" function that opens an info viewer (described separately) for the selected asset(s). When mousing-over or right-clicking an asset, the UI may surface, or present, an option to view Info on it.

DAMS may include a "Print" function that prints the selected asset, scaled to full-Jo size/full-screen by default. When mousing-over or right-clicking an asset the UI may surface, or present, an option to Print it, if it may be a non-audio asset. Videos may print a still of the paused or cued frame.

DAMS may include a "Download" function that allows the user to download any asset from a host to local storage. When mousing-over a file, collection, or show, the UI may surface, or present, an option to download it. If a user attempts to download a collection, the collection name may be treated like a folder. By default, the collection may be preserved as a set of files within that folder and the files within the folder may be all downloaded to the user's chosen destination. The user may override the process so that only the collection's files, but not the collection folder, may be written to the user's chosen destination. If a user attempts to download a show other than an audio playlist, this may be treated like a collection (above). DAMS playback information file may not be delivered in the download. The user may receive a prompt indicating that Shows may only be viewed and shared using DAMS, and that the files in the show may be downloaded but the show playback information may not.

Viewing and editing metadata/tags is available with the DAMS. DAMS may include an info area that displays metadata about any selected asset(s) in DAMS and allows the user to edit metadata tags. The info area allows the user to view info for single or multiple assets that may be highlighted or dragged to the Info area. When multiple assets may be selected, the Info area may provide next/prev functionality to review the specific details for each asset.

Metadata in the info area may include the following information and capabilities: name; file/asset type; size; create date; upload date; last modified date; Shared to (via DAMS); Shared from (via DAMS); Industry-standard music metadata (for music files only) such as genre, artist, etc.; Industry-standard video metadata (for video files only), where available; EXIF v2.2 data for each picture, including GPS data in GPX v1.1 format. Collection associations may be made available to the user to provide a listing of all logical collection associations. In this way, a file may list all collections that it may be part of, and a collection may list all other collections that it may be a part of. DAMS may provide the ability to invoke an action from the list of standard functions for each file, such as Preview fullscreen, Open, Download, Delete, and Print (if applicable). Editable Tags may be listed to provide a listing of all tags affiliated with the object, separated into the categories General, People, Places, Events. Functionality may be offered for the user to add up to three custom categories in addition to General, People, Places, Events. The user may not have the capability of deleting the existing four categories, since (for example) "People" may be partially auto-populated, and since future product enhancements may involve auto-tagging in the other three default categories.

The user may delete tags and associations to collections. The info area may present a clear way to delete any existing tag or logical collection association. The info area may present an entry field for adding one or more new tags and for applying a star rating to the asset. By default, all tags added subsequently appear in the "Tags—General" category. The user may be entering one or more tags before saving the tag(s) to the database.

The user may optionally rate an asset from 1 to 5 stars with or without adding textual tags before saving the changes to the database. All prior tags entered in all categories, across all of the user's digital asset management system storage may be available for the user to select and apply via auto-complete when the user begins typing in the field. The interface may support the addition of multiple tags at once, separated by some delimiter. The interface may support selecting of more than one asset and applying the desired tag(s) to all of the selected assets at once. After tag addition, all the customized tag categories (each containing its entered tags) may appear as filters in the interface so that the user may quickly browse and hone-in on assets with specific tags. All tags and the star ratings may appear filters and may also serve the role of drop-zones for assets. When one or more asset(s) are dragged-and-dropped over a specific tag, or a 1, 2, 3, 4, or 5 star rating, that tag or rating may be automatically applied to the asset(s). The drag-and-drop destination for applying tags and ratings may include an "Add tag" function so that the user may add a tag on the fly in case the desired tag does not yet exist. In sum, to apply tags and/or ratings, the user has the option of either manually entering ratings or tags, supported by auto-complete, or, dragging-and-dropping over a tag, add-tag, or rating function.

The synching, or synchronization, process generally enables anytime, anywhere access to important files with or without an Internet connection. The digital asset management system automatically synchronizes file additions and changes across a subset of user-identified files/folders on one or more local PC(s) or device(s) with the user's host-based storage on the digital asset management system. Synching operations include: client(s) supporting Windows sources; synching whole-files in the event of a change (rather than synching only byte-level differences); synch client(s) supporting Mac and top devices as sources; and/or synchronizing byte-level differences for updated files, rather than entire file replacements. Once enabled by the user, synchronization occurs automatically in the background whenever an Internet connection may be present on the local machine(s). Messaging in the Web-UI physical storage view may indicate that Synch setup and edits may be performed using the digital asset management system client software, and may include instructions or a link for acquiring the client.

The synch client may be required on source machine. The synch client may be delivered as part of the digital asset management system client download. The user may be required to download and install the client and access the Synch setup feature therein. A Synch Setup Wizard may help the user after starting up the Synch Tool on the client. The user may be led through a Wizard-based process to setup synch for each source designated by the user, including naming the source where the user may be required to set the name during the synch setup process (e.g., Mary's Laptop). Null/blank names may not be accepted. A Use Tool may suggest files as the synch setup may provide a tool (akin to Xdrive's backup files-suggestion utility) to earmark the folders and files on the source machine that the user wants synched to the digital asset management system, and, separately, to choose any other Folders/Files in the digital asset management system (files from other synched sources, etc.) that the user wants synched back to the machine. The user may choose a one-time upload or synch to set whether this may be a one-time upload or whether future changes to files/folders earmarked on the source machine may be to be automatically sent to the digital asset management system. The user may choose one-way or bi-directional synching so that if user has selected Synch, rather than one-time upload, then the user may be prompted to set whether they want one-way or bi-directional synch on future changes.

The client synch UI may provide functions to edit the synch settings (including the following) after the user has initially setup a source for synch using the wizard: Rename source, Add Folders/Files, Remove Folders/Files Change setting for one-time-upload vs. Synch, Change setting for one-way vs. bi-directional, and Exclude. The system's capabilities may include having the client synch UI providing a way for the user to mark a file or folder to be temporarily excluded from synching, and then unmark the asset to resume synching. Once marked for exclusion, the file or folder may remain in the synched file list, but may be clearly marked to be excluded from future synchs. When the user removes the exclude flag, the asset may resume normal synching subject to the user's settings.

When a synch begins execution, the user may receive notice from the "toaster" that the synch may be about to begin in 30 seconds, with a user option to cancel the synch. If the user cancels the synch, synch attempts again at the next session that an Internet connection may be detected. If the user allows the timer to rundown, the synch begins. When the synch completes, the toaster may inform the user that it has completed the process. The user may cancel, pause, or resume a synch operation by bringing the synch application into focus on their desktop (it generally runs in a background state otherwise) and selecting one of those options, all of which are preferably surfaced, or presented, in the UI while synch may be underway. If a synch session is interrupted via lost connection, error, etc., the synch may resume where it left-off when the connection or application may be restored. A log of each synch action may be maintained for 30 days running, containing date and time of each synch attempt, name and source path of each synched file, and success/failure (with reason). The 30 day log may be accessible to the user from the in-focus synch UI on the client machine and from the Notifications Center (described below). The Edit Toaster setting, for synch may be provided by the client UI to provide a way for the user to turn the Synch beginning and completion notices off/on (default on).

One possible write policy has the digital asset management system completing copying of entire files from the digital asset management system to source, or from source to the digital asset management system, from oldest changes to newest changes, until either destination may be full. A capacity warning may be issued if/when the destination reaches capacity. The user may be presented with error messaging about the incomplete synch operation and encouraged to delete files from source or target, or exclude some files from synch.

The synch process may be used under several circumstances. In one embodiment offline access to files may be enabled while a synch may occur when a connection is established. A user may connect to her digital asset management system to refresh her synched folder on her local computer (which may be a folder that may be accessed via any device/PC). The user may then disconnect from the network and work offline on her files. She may then reconnect to the network and the updated files may be synched back to the digital asset management system automatically based upon pre-set parameters that may be transparent to the user.

For a bidirectional synch, the user already has a folder that may be synched amongst multiple devices/PCs. The user downloads file(s) from a synching folder for editing on a shared workstation that may not be one of the synched devices. The user edits the file and manually uploads back to the synced folder on the digital asset management system. The user accesses the folder from synched computer, and the updated file (with the newest edits) may be available via that computer or any synched device/PC.

Synchronization may also enable publication. For example, a user may select a local folder of photos for synchronization with the digital asset management system. The user directs the digital asset management system to use the photos in the synchronized folder to populate her online photo album/show. The user uploads new photos from time to time from her digital camera to the synched folder on her computer. The new photos may be automatically synched up to her digital asset management system via parameters that the user set. The photo albums/shows may be updated with the new photos. The user may then access photos on her digital asset management system via multiple machines and mobile devices.

In another embodiment, for example, Adrienne creates and shares a collection on the digital asset management system with Gio. Gio selects the collection for synch to his local computer. Adrienne uploads a new file to the collection in her digital asset management system account, which may be auto-synched to Gio's local computer.

In another embodiment, Shelli synchs files to her work PC via auto-sync (with user pre-set settings). Shelli disconnects her local work PC from the network to work offline and proceeds with editing her file(s). Alfred may be in the same work group and synchs the same files to his local PC. Alfred edits one of the files locally on his work PC. Alfred's changes may be synched to the digital asset management system via auto-sync (user pre-set settings). Shelli goes back online and auto-sync process begins. The digital asset management system client warns her of a conflict, acknowledging the differences in the files and offers conflict resolution or a file differencing solution, which could include but may not be limited to the ability to ignore and overwrite, save with a different name, retrieve the online version, etc.

The Backup feature in the DAMS enables users to backup selected folders and files on demand, or on a scheduled basis. Messaging in the Web-UI physical storage view may indicate that Backup setup and edits may be performed using the digital asset management system client software, and may include instructions or a link for acquiring the client.

The backup client may be present on the source machine. The backup client may be delivered as part of the digital asset management system client download. The user may be required to download and install the client, and access the backup setup feature therein. A Backup Setup Wizard may be used after starting up the Backup Tool on the client. The user may be led through a Wizard-based process to setup backup for the source. The user may be required to set the name of the source during the Backup setup process (e.g., Mary's Laptop). Null/blank names may not be accepted.

A "use tool" may suggest files. The backup setup may provide a tool (akin to Xdrive's current backup files-suggestion utility) to earmark the folders and files on the source machine that the user may want backed up to the digital asset management system. Each backup may be a snapshot in time of selected folders and files (first time backup), or changes/ addition to those files (subsequent backups), written to the host. If prior backups have been run, the new backups may overwrite items with the same name and versioning may not be necessary. For advanced users options for different backup sets and for versioning (saving time stamped versions of files with the same name) may be available. Users may optionally schedule backups to occur on a routine basis setting frequency (e.g., every 1-30 days) and/or time (according to user's system clock). Users may generally be required to have their computer turned on and connected to the Internet at the scheduled time in order for the backup to occur.

The client backup UI may need to provide functions to edit backup settings such as the following after the user has initially setup a source for backup using the wizard: rename source, add folders/files for next backup, remove folders/ files from next backup, and change schedule, etc.

When a scheduled backup (one that is not a backup on demand) begins execution, the user may receive notice from the "toaster" that the backup may be about to begin in 30 seconds, with the user having the option to cancel the backup. If the user cancels the backup, backup attempts are made again at the next scheduled timeslot. If the user allows the timer to rundown, the backup begins. When the backup completes, the toaster may inform the user that it has completed. A log of each backup action may be maintained for 30 days running, containing date and time of each backup attempt, the name and source path of each synched file, and success/failure (with reason). The 30 day log may be accessible to the user from the in-focus Backup UI on the client machine and from the Notifications Center (described below). The client UI may provide a way for the user to turn the Backup beginning and completion notices off/on (default on).

The digital asset management system may complete copying of entire files from source to the digital asset management system, from oldest changes to newest changes, until the digital asset management system capacity may be reached. A capacity warning may issue when the destination reaches capacity. The user may be then presented with an error message about the incomplete backup operation, and encouraged to upgrade to more space, delete files from the digital asset management system, or to remove some files from being backup.

The digital asset management system may include a function to upload one or more file(s) from a user's machine via the Web UI. The manual upload may be modeled after Xdrive functionality, but consistent with the digital asset management system UI. The management system may reduce clicks as much as possible. The default may be a fast, compressed experience for all users so that the user can get things done with the fewest obstacles. A basic/slower solution may only be preferable if the fast upload requires components, (e.g., Java in Xdrive's current solution) and those components may not be present on the machine. The upload UI may include an option for the user to specify one or more tag(s) that may be added to the file(s) during upload.

The digital asset management system may include a function to upload one or more file(s) from a user's machine via the digital asset management system client. The manual upload from the client may be modeled after Xdrive functionality, but may be consistent with the digital asset management system UI experience. The upload UI may include an option for the user to specify one or more tag(s) that may be added to the file(s) during upload.

The digital asset management system may deliver with the client download a desktop widget. Desktop widget functions may include an upload drop area as an area on the widget to drag and drop one or more file(s) for upload. The widget's UI may include an option for the user to specify one or more tag(s) that may be added to the file(s) during upload. Uploaded files may be instantly uploaded and placed in a default Manual Uploads Collection, and may be easily viewed as a group by the user by filtering on the "Source" category. Manual uploads may be achieved via the digital asset management system web UI. An open digital asset management system client provides a function to open the full client to access its features. The widget may also provide a function to start the default browser and direct it to the DAMS website. A readout of storage used and total capacity, plus an optical link to "Get More" may also be provided by the widget.

Sharing files and collections with rostered recipients is another aspect of the DAMS and is achieved via functions similar to Xdrive sharing, but with an updated UI and some changes as indicated herein. Sharing functions may include support for dragging an asset to a contact name in order to share it, and the ability to add a custom subject and message if desired. In sharing files and collections, users may not be presented separate "share" vs. "send" options. The UI may address all such activities as "sharing," but may surface, or present, permission-setting options only for Collections. When a user shares the one or more file(s) or collection(s) (unrestricted by permissions) with up to 25 users, each recipient may not be obligated to register and may freely access (read/copy/download) the asset via a link in a digital asset management system generated e-mail. The optional limit of 25 on unregistered access to a shared file may be designed to prevent abuse, such as the user sharing with one's self and then putting the e-mailed access URL in a public webpage or blog subject to very high traffic. The max share limit referenced above (25) may be configurable so that it may be changed at any time if the needs of the business or host change. If the sender has set restrictive permissions for one or more sharees of a Collection, then the URL received in email by all of those sharees may require each of those sharees to register to access the asset. The registration allows the system to match the sharee to his/her specific privileges. Any recipient after the 25th recipient may register as, minimally, a free-account holder, to receive the file(s) or collection(s).

Sharees who have not yet registered for the DAMS may have 60 days to pick up a shared asset before the asset may be deleted. Sharees who have registered may have no time restrictions on picking up shared assets. Their digital asset management system inbox may, however, be capped at a maximum size and subject to automatic first-in-first-out clearing, as described herein. The system may support the ability to block sharing by all users of specific file type extensions, if directed by the business or host, within 24 hours. This feature may include support for Xdrive's unique permission management features. This enables the user to set each rostered recipient's access to shared Collections to: read and download, modify one or more name(s), add assets, delete, edit, and share. These labels may change as needed to arrive at the ideal label names that may be most understandable to the user.

The default permission may be "unrestricted" for sharing where the user merely drags-and-drops an asset over a name and does not set custom privileges. Users may be offered a means to override the default share permission in a pre-share confirmation window. This action redirects the user to an area where they may select the desired custom permissions for any or all of the recipients and then complete the sharing of the Collection. In sharing tags, by default, all metadata tags on an asset may be included with the asset when it may be shared. Hence, the recipient may have all of the historical tags on the asset already in place when it is received. A function may be provided for the user to override this share-tags default. The user may override tag-sharing on an asset-by-asset basis, or as a "sticky" or prevailing setting for all assets. E-mails to sharees may display the icon or shrunken image of the asset or collection (same as the sender sees in the object-view), rather than just a textual hyperlink to click on. The icon or image may have a text label below it that encourages the user to click the icon/image to access the asset. To access the asset, the sharee may click on the image/icon to invoke the correct URL, rather than having to click on the same URL in the form of a textual hyperlink. All default system-generated text in e-mails and sharee landing pages may be reviewed and revised by the product and marketing teams.

Functions associated with the sharing public collection may operate in the same manner as Xdrive public folder creation but with an updated UI. Such function(s) may create the collection and generate access URL and image/URL combination(s) that the creator may share/post anywhere, and disable if desired. Disabling may prevent public access but does not delete the Public Collection. As with Xdrive Public Folders, those who click on the URL may be required to register to access the contents of Public Collections. Collections that contain video or music files may not be allowed to be made into Public Collections.

After an asset has been shared, a visual indicator may appear beside it when it may be displayed in the DAMS. The indicator serves multiple role. One is a visual cue that the asset has been shared. Others include providing metadata as clicking on the indicator may provide the user with information on who the file was shared with, whether each digital asset management system registered recipient has received the asset (it may not be possible to track such actions in cases where the sharee may access the asset without registering), and allowing the user to adjust the sharing permissions for an already shared file as desired.

The digital asset management system may support RSS notification of share events as follows. The digital asset management system generates an RSS URL on demand from a signed-in digital asset management system user. Every URL may be unique, dynamically generated, and contain some non-intuitive values which may enhance privacy of the feed. Users may paste these URLs into their choice of RSS readers. The digital asset management system may support the Add-to-My AOL button on the page, allowing the user to bypass the multistep URL copy/paste process where their RSS reader of choice may be My AOL or similar (see, e.g., http://feeds.my.aol.com/button.jsp).

Events for the feed include (for example): when someone shares with me (the user), when someone receives/picks-up my share, when someone updates a shared collection (shared with private or shared with public) (as follows: Adds, Deletes, and/or Updates (not for updates that may be only metadata updates)). Info in the feed may include the sharer, sharee, asset name, and description (if any, from standard file metadata). User options that may be supported in the UI include generating feed, and regenerating the feed (old URL may be no longer work). The latter is used if the user may be concerned that original URL has been obtained by someone not desired. Add to My AOL and/or Delete feed (URL may be no longer function) may also be user options The digital asset management system may support a Buddy Feed API under the present AOL system. Share events (generally the same as those in RSS notification) may be passed to the Buddy Feed API. For Buddy List users, this may result in the names in the buddy list lighting up to indicate new share event information. The UI may be Audience/Buddy List controlled.

The digital asset management system client may include a toaster mechanism ("toaster") that surfaces, or presents, share event information (such as the same events and info as the RSS feed) via the toaster in near real-time, if the user is online. If the user is not with a specific host system (i.e., AOL or AIM), then they may also be authenticated for toaster to function. The digital asset management system may use the toaster and its API. This may be done for consistency, and to prevent proliferation of different toasters, particularly for AOL and AIM users.

It is an option to restrict which events may be presented in the toaster. The client UI may be required to provide the capability for users to see a list of Share Notification event types and turn any of the notifications off/on. The default may be 'on' for all event types. Another option is to restrict which "people" events may be presents in toaster. The client UI may be required to provide the capability for users to restrict the toaster to only present share notifications about specific persons. The default may be all supported events for all people. The user may customize the system to have all supported events for only a specific list of people. The user may not be able to customize to have varying supported events for varying users.

The digital asset management system may include a "Notifications Center" which the user may view at any time. The Notifications Center may serve multiple roles, including presenting the user with assets shared (received and sent) through the digital asset management system. The user may quarantine those assets until the user reviews them and decides whether to accept them into his own digital asset management system storage. A new items indicator may provide a visual cue the user may see when not in the Notifications Center. It indicates that new items have arrived since the last time the user had the Notifications Center in focus. The Notifications Center may update in near real-time to post newly received assets, whether the user has the Notifications Center in focus or not. Scrollable presentation of items received may include information regarding the sender, the asset name, the date/time received, and/or the subject (if any). A link to click and view message from the sender (if any) may be provided. The actual item may be displayed in the viewer/player, or cued-up and ready to play if the item is video or music.

Sortable presentations may be available via the notifications center. By default, incoming assets may be displayed in order of date received (newest first). The user may select from other sorting criteria if desired, including sender, subject, asset name, or asset type, where the latter includes pictures, music, video, text, collections, and shows. Searchable search terms entered may search across sender, subject, asset name and otherwise. Ability to perform standard functions on any file received may be provided including: preview fullscreen, open, download, delete, print, and/or info (invokes info panel with all of its functions).

Also present may be the ability to add an asset to any collection via drag-and-drop. The ability to add an asset to the digital asset management system general storage via drag-and-drop, the ability to share an asset via drag-and-drop functions, the ability to toggle views between the main digital asset management system asset view and Notifications Center view, and the ability to change to an outbox view (outbound shares), if desired, and toggle back to the inbox by default, the incoming shares view appears are all capacities available to the user via the notifications center. The notification center may provide access to other notifications-related functions including RSS feed management and toaster management. A presence indicator denoting whether the sender may be online or offline, and/or if sender may be an AOL or AIM screen name may be provided, as may the ability to IM (instant message) a sender. This last function may invoke the IM client with the recipient name prepopulated, if possible.

The notification center may also enable the ability to e-mail the sender. This invokes the email client, if possible with the email recipient name prepopulated in the "to" field. The e-mail client invoked may be the one matching the user's primary e-mail source in the digital asset management system. If no email access has been configured for the digital asset management system, the e-mail client may be the default email client as determined by the OS.

Assets generally remain in the Notifications Center inbox indefinitely, consuming no more than a whole number, user-configurable percentage of total storage, between 5% and 50%. The default may be 20%. If the inbox capacity is reached, assets may be deleted in first-in-first-out order to stay below the maximum. Assets may be removed from the inbox via addition to all digital asset management system, addition to a collection, deletion, and/or auto-deleting (first-in-first-out, if inbox reaches capacity).

The report of outbound sharing in the Notifications Center outbox may remain indefinitely. The outbound sharing view may also denote with some visual cue whether or not each recipient has received/picked up the shared asset. If a user attempts to perform any action with an asset listed in the outbox (e.g., view it), and the asset is no longer in the digital asset management system, an error message may tell the user that the item was deleted from the digital asset management system subsequent to sharing.

The notifications center may include an area for synch and backup notices. This area may contain a summary of any recent additions to the user's digital asset management system storage via synch or backup. User/owner initiated additions such as these may not require quarantining, unlike files received from other users. The summary may include the following columns/fields: origin (e.g., "Backup from <source name>"), date and time, files attempted (quantity), files successful (quantity), and/or link to view the log.

The digital asset management system may feature a trash can for deleting files. The trash can deletes physical files and their logical references and tags. Users may drag any asset to the trash can, or highlight it and click on the trashcan function. The trashcan generally requires user confirmation before deleting files.

If an asset is dragged to the trash can from a collection, the user may receive a confirmation message asking if they just want to delete the asset from that collection (default), or delete it entirely from the digital asset management system. If multiple items are dragged to trash, the message may prompt for each asset but offer capability to set the selected answer for all selected assets, to avoid having to process each delete warning screen. The trashcan may be emptied, resulting in permanent deletion of the files. Files in the trashcan cannot be used/referenced by any other assets. The user may open the trashcan and click on a function to restore selected files to their original path and logical associations. Alternatively, users may drag selected files out to restore them. Files in the trashcan may count against the user's storage quota. Users may set a cap on the trashcan's size, as a whole number percentage of total quota. The default may be 10%. When the cap is met, the trashcan may purge contents on a first-in-first-out (FIFO) basis to remain under the percentage cap.

The digital asset management system may integrate McAfee's or some other host-based virus-scanning engine through AOL's existing partnership with McAfee. The digital asset management system may scan all files on upload. If a virus is found, the digital asset management system may prompt the user with the following options: repair, delete, quarantine, and/or ignore. The configuration options that may be offered in the UI may include turning the scanning off/on (default may be on) and/or set default action to take upon failure (default may be to present all choices to user).

Users may be able to send and/or receive fax documents with functions generally same as Xdrive but with an updated UI.

The digital asset management system may include a contacts tool for use in viewing contact information and facilitating sharing of files.

The digital asset management system's contacts system may be integrated with the AOL/AIM address book backend and which may provide aggregation of address book contacts and buddies into a single "People" view. AOL, AIM, and the digital asset management system may read and write to this common datastore. The digital asset management system may have its own UI skin depicting the "People" backend storage.

Via a "setup contacts" function (e.g., "Choose who appears here") the user may choose which contacts from their contacts database appear on the contacts area of the D AMS. These contacts may be destinations for drag-and-drop sharing actions. The setup function allows users to easily check-off those names they want to appear (select of one or more, select all, unselect all).

Sharing with someone not displayed in the contacts panel is contemplated. The contacts area may offer a sharing dropzone to share with someone not listed in the contacts panel (i.e., an ad hoc share with someone that the user does not want to formally add to their contacts). Dragging to that destination may allow the user to enter an e-mail address of a recipient on-the-fly and complete the share.

Users with AOL or AIM address books may find that their digital asset management system contacts tool may be already populated with all of the data in their AOL or AIM address book. The contacts panel may also feature a presence indicator, and clickable functions to IM or E-mail applications if desired. Such applications may include IM, AIM, or if user is with AOL and the AIM client not present, then AOL may be invoked. If no IM client is present, the error or other message may include information on how to obtain AIM. For E-mail, the system may invoke AOL service most recently used version for AOL users, AIM Mail for AOL users, and/or the OS-designated e-mail program for other users. The user may be able to change which IM application and which e-mail application may be automatically invoked.

The digital asset management system may support 2-way synch of Outlook Contacts. Some approaches for consideration (not an exclusive list) include: delivering an Outlook plugin with the digital asset management system client install and/or invoking Outlook synch capabilities provided by the AOL Address Book (which may serve as the backend datastore). The function may offer a 2-way synch function and may be performed on demand only.

The digital asset management system may support the import action of Outlook Calendar data. The digital asset management system may provide a read-only viewer for this calendar data, presenting monthly and daily views alone. The function may offer a 1-way import only, on demand. On subsequent runs of the import facility, the Outlook calendar information in the digital asset management system may be completely replaced by the new data.

The digital asset management system may feature a "manage space" function, offering detailed quota information and functions to buy more space (where applicable). This may have essentially the same functions as an Xdrive Manage Space function, but with an updated UI. For accounts featuring multiple seats (workgroup and access "family plan" accounts), the "manage space" area may include functions allowing the administrator/master-acct to alter the storage levels assigned to each seat. Users may receive a pop-up notice upon sign-in to the digital asset management system when the user's quota reaches x % capacity (where x may be configurable according to the needs of a marketing or other team). The notice may include user options to Upgrade Now, Remind Me Later (next session), and/or Don't Remind Me Again. If the user reaches 100% capacity, the user may receive a pop-up notice upon sign-in to the digital asset management system. The text may indicate that no additional storage may be permitted unless the user upgrades for more space or deletes assets. The notice may include user options to Upgrade Now or Remind Me Later (next session).

The digital asset management system may make available an Open API to allow other developers to create additional tools that access the digital asset management system storage. The digital asset management system (DAMS) may open this API to 3rd party developers. The Open API effort may be managed and documented by a technical team. Example initial or other applications for API may include: building a "dropzone" into AIM and AIMPro for easy addition of AIM-shared files directly to the digital asset management system, building and continually refreshing an AOL-supported public collection for Winamp compatible materials/files, populating in one place skins, effects, and other files and promotions that appeal to Winamp to users, promoted directly through Winamp to stimulate the digital asset management system subscriptions.

Two the digital asset management system Modules may be constructed using AIMPages' SDK available at iamalpha.com. Such modules may include Photos and/or Webgrabs. Such modules may be made available by AIM Pages to its users. They may provide an easy way for AIM Pages users' to directly reference the digital asset management system stored assets and capabilities in their AIM Pages area.

For example, with photos, Jane may create a public collection of her garden photos in the digital asset management system and then make those photos available to others on her AIM Page. The module may display the actual photos or at least the first photo in an album. Clicking on the photo(s) may take the AIMPage visitor to Jane's public collection of photos in the digital asset management system. This module may support display of almost any digital asset management system stored asset type directly on the AIM-Page, including videos and documents, in addition to photos.

For a Webgrab example, Bill regularly updates his AIM-Page with pictures and different articles. Mary complains that she didn't get to read all of Bill's AIMPage content from Friday before he changed it again the following Monday. Bill responds by inserting a digital asset management system Webgrab module onto his AIMPage. On his page, it reads, "Like what you see? Click here to save this page to your digital asset management system storage . . . . Quick, do it now before I change my AIMPage again!" Now, when visitors come to his AIMPage and click on that module, it webgrabs the current contents of his AIMPage and stores that content in the visitor's digital asset management system storage area. If the visitor doesn't have the digital asset management system yet, the webgrab action kicks of an automatic provisioning process for the visitor and provisions their digital asset management system storage area, then subsequently stores the webgrabbed content in it. Now Mary may webgrab Bill's AIMPage anytime she likes, and enjoy catching up with all of Bill's AIMPage versions on her own time, by just opening up her digital asset management system storage and clicking on the stored copies of Bill's AIMPage.

The digital asset management system may present read/write access to a user's AIM pages storage through the DAMS. DAMS may communicate with AIM Pages' storage via the WEBDav protocol. With the digital asset management system having the functionality to be a WebDAV client, then the digital asset management system users may read/write the assets of their AIM Page directly through the digital asset management system. This may include read/write from/to AIM Pages' included storage, and any storage above that the user chooses to maintain on the digital asset management system.

All digital asset management system users (free and paying) may be entitled to request and receive one DVD per year containing up to 4.7 GB of selected files. All digital asset management system users may have a system-generated, not-deletable Collection in the digital asset management system called "Free CD" The Free CD collection may be capped at 4.7 GB in total file size. If a user attempts to add more than 4.7 GB to the collection they may receive error messaging encouraging them to delete files. When a user opens the Free. CD collection, a dialog box may appear with text and functionality as follows. An explanation of the Free CD program may be presented with AOL, the user sending a DVD with the files that have been placed in the Free CD folder. Up to 4.7 GB maximum, the user may receive one CD per year. The user may be eligible for his free CD after his one-year anniversary of registration with the digital asset management system. Registration Date: <Date> Date of last request for CD: <Date> or "None" Date eligible for CD: <Date> (next one year anniversary of registration date) Button: Request CD (logic check performed on dates). If not eligible, the user may receive an error. If eligible, user may be taken to address form).

An Address Collection and 'Send CD' function may occur. An address form may appear if the user selects 'Request CD' and is eligible. Instructions telling the user to enter the mailing address for the CD may be displayed. This address may be stored, pre-populated, and editable the next time the user returns to this function. Below the address fields may be text indicating that this may be the final step and all files the user wants on the CD need to be in the Collection now before he clicks 'Send CD'.

The user may click the Send CD button and, subject to a logic check to ensure one or more files may be in the Collection and to ensure that the address fields may be complete/valid, the user may be presented with a final confirmation message "Your CD will be sent to <address>." OK and Cancel buttons enable the user to confirm or abandon the CD request. If the user cancels, the system saves no changes and returns to collection view.

DVD fulfillment may be managed by a 3rd party. The details of how data may be passed and securely handled, from the digital asset management system to the 3rd party CD fulfillment system, may be established by mutual agreement.

Users may receive an email once per year on the anniversary of their registration date reminding them of the annual free CD offer and describing how it works. Users may receive a confirmation e-mail after all successful CD generation requests. It may include shipping address and expected delivery timeframe. The system may include a separate "Order another CD" function, allowing each user to order up to 3 CDs per year, for a fee, in addition to their free CD. Each ordered CD includes the contents of the Free CD Collection at the time of the CD request. This may require collection of billing information/presentation of card-on-file, if applicable.

It may be possible to give personal pages (with the user's own assets) and public/shared pages (with other user's assets) different ratings, such as ICRA labeling as used in Germany. The rating defines the classification of the content.

Other features include publishing resources to webpages, blogs, and/or podcasts.

For an RSS podcast subscription uploader, possibly via API or otherwise, it may be possible to subscribe to RSS feeds (via a Feeds and Favorites platform) and embedded enclosures of those feeds may be uploaded to a specific folder including virus scanning. The "RSS Podcast Subscription Uploader" may support music, video and other file types. For better organization, RSS 2.0x categories may be used as tags of the uploaded assets.

For a RSS Podcast/Vcast uploader, each folder may be turned into a broadcasting "bucket." All assets (audio, video, photos, etc.) in this folder may be published as a RSS feed with enclosures including the associated tags. If an email/wireless drop-box may be connected to one of these folders, it would be possible to broadcast the user's life, recorded on text, audio, video or photo to the world. A kind of rich media asset blogging tool.

Face recognition/auto-tagging may also be available through DAMS.

The client system may include its own help via a Search and Browse interface stored locally. This help may be localized in each supported country. The web experience may feature online help available to all users and may be country specific. When invoked, Help may open with information contextually related to the area/function of the product in use.

If a non-Access, free account holder does not sign-in to the digital asset management system for 120 days consecutively, their account may be deemed inactive and earmarked for deletion if inactivity continues until the 150 day mark. E-mail notification may be sent to the user on day 120 of inactivity, warning the user that the account may be deleted in 30 days if the user does not sign-in. If the user has not signed-in after 150 days of inactivity, the account and all of the user files therein may be deleted on day 151. Users may be informed of the purge-for-inactivity program in the Terms of Service that they may sign at registration.

All Member Services requirements for the digital asset management system may be built as part of DAMS.

The following abbreviations are used herein:
AP: AOL Pictures
Collections: A logical arrangement of assets by categorization as opposed to foldering.
XFS: The Xdrive File System To effect the description herein, the Enterprise viewpoint, also called the Global viewpoint takes the perspective of a business model. This viewpoint is preferably understandable by the stakeholders of the system. In UML (unified modeling language) terms, this viewpoint correlates to use cases; explaining what a system is preferably able to do, what it will be used for, who will use it, etc.

Some variants in the DAMS are as follows. Users may generally not upload via the digital asset management system application. Users may generally not have the ability to edit permissions via the Digital asset management system application. Users may generally not be able to select permission sets upon sharing within the digital asset management system application. The digital asset management system may generally not allow users to edit shared shows. All shares may default to READ/SHARE.

Some invariants of the system may be that users are preferably able to interact with their collections as folders via file navigation.

Some rules applicable to the system include the following. New collections preferably have the same quota cost as new folders. Adding a file or folder to a collection is like making an alias to the original. Adding a file or folder to a collection will take no additional quota. Deleting the original will automatically remove the object from any collection. Removing an object from a collection may generally not affect the original.

A key goal for digital asset management system is to extend the X-drive platform and open up to external development and access. Providing useful interfaces and interface products are seen as advancing this key goal. The digital asset management system will generally create five families of extensibility and open access:

| GROUP | DESCRIPTION | AUDIENCE | EXAMPLES |
| --- | --- | --- | --- |
| Open API | An application programming interface that is documented for and exposed to the public. The Open API would be implemented in a standard Remote Procedure Call mechanism over via the web. | Developers | JSON API |
| SDK | Libraries and packages development kits target for specific platforms. These SDKs would make it easier to utilize our APIs in efficient and powerful ways on platforms that we would support. | Developers Platform developers | Windows File System SDK |
| Publishing Channels | Ways for users to access assets and resources via standard protocols. | Users | Permalinks RSS |
| Embeds/ Widget | Built for an open framework/platform, i.e., web browsers and OS X Dashboard. It is a small application that gives Xdrive functionality that users can easily deploy and consume. | Users | Flash Slide Show Widget |
| Plugins/ Integrations | Small applications that plug into larger applications to add functionality. These are usually developed using the 3$^{rd}$ party application's SDKs. | Users | IE Toolbar |

In the digital asset management system ("DAMS") release, an Open API and Open Channels are or will be introduced. The DAMS Open API is preferably the Xdrive Data Services Platform JSON API v1.1 (http://dev.aol.com/xdrive_api and http://dev.aol.com/api/xdrive).

The open channel introduced in DAMS is preferably an RSS feed encapsulating the data for the Show Application.

The informational viewpoint addresses the information in the system and the information about the system, or its behavior. This viewpoint explains the data model in the system: what the system needs to know and to remember. It also explains the rules to be followed by the system, policies specified by the stakeholders, how things work together, rules for allowable change in state, things that are preferably always be true (invariants), and quality attributes.

Certain assumptions are made with respect to DAMS. Collections will extend the data type for folder. This will include the icon selected for the collection and Collection-specific meta-data.

Collection meta-data may generally not be available to end-users, as it is for the system. A collection preferably has a folder representation, or backing Collection folders are preferably visible and mutable by users as normal folders. A collection folder will either contain other collection folders, links to files, or links to folders. When a user removes a link to a file or folder, it will not affect the aliased object. There will only be one default sharing set of permissions for collections at any given time. For example, if R/S is the default, it is preferably the global collections permission default. All collection meta-data is preferably named space. A show is a collection with meta-data for a show.

FIG. 1 shows a data model 100 and the relationship between a file 102, a link 104 to that file 102, and their respective attributes 106, 108. In FIG. 1, one can see the attributes 106, 108 of both the linked file instantiation 104 and file 102 to which the instantiation 104 is linked. Additionally, the file instantiation 104 points 110 to the file 102 and is of generally the same type 112 as the file.

DAMS provides a mechanism for both FILE and FOLDER entities to support something like symlinks (also known as symbolic links or soft links). The linked files and folders are preferably a type of FILES and FOLDERS respectively. They preferably have additional attributes. For example, the linked FILE will preferably have .type=link 120 and it will point to a FILE 102 that has type=jpeg 140. In this case, the data object will not have one type override the other type, but both need to be returned for the data model 100. So the resultant object will use the type=link to make a FileObject.isLinked( )=true and FileObject.getType( )==jpeg.

Figure 2:
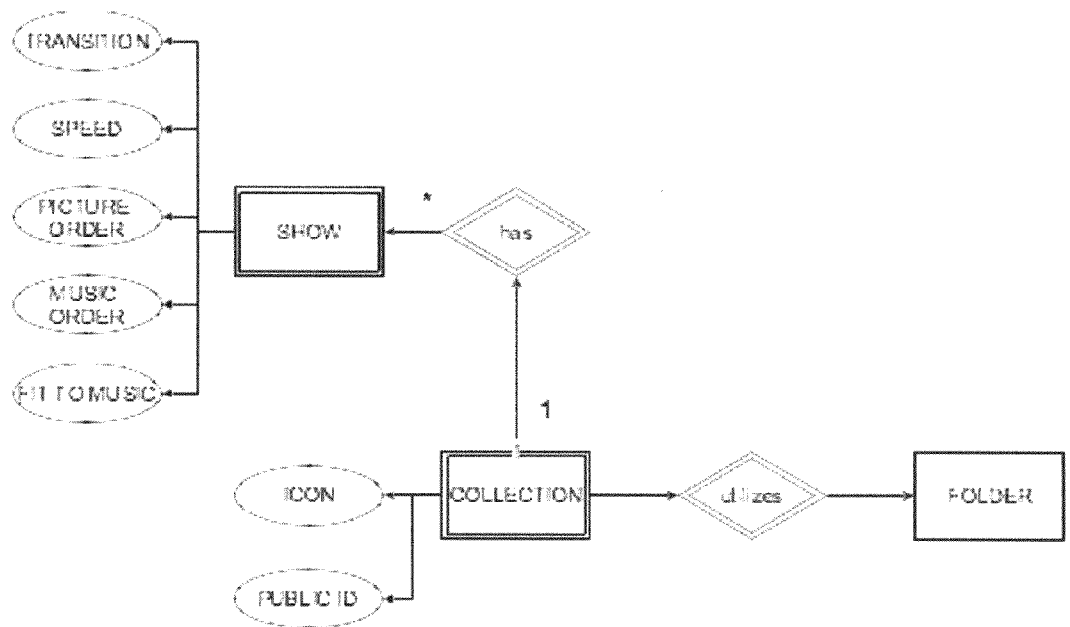
FIG. 2 is a schematic view of a folder used by a collection having a show.

FIG. 2 shows a date model 200 for a collection 202 having a show 204. In FIG. 2, the collection 202 has a show 204 with the specific attributes 206 shown: transition, speed, picture order, music order, and fit to music. Other attributes may also be a part of the show.

The collection enjoys or has an icon 208 and a public ID 210. The collection utilizes a folder 212.

Figure 3:
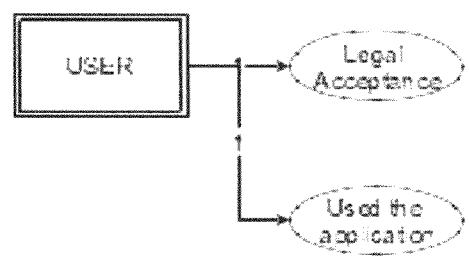
FIG. 3 is a schematic representation of a user with a requirement for legal acceptance as well as having use of the application.

FIG. 3 shows a data model 300 for a user 302. In FIG. 3, user attributes 304 include whether or not the user has accepted the legal terms pertinent to the system 306 and whether or not the user has used the application before 308.

The Show Application will need to be able to query the system to see if the user has accepted the legal terms 306 and/or the user has used the application before 308.

A show preferably has two RSS feeds associated with it: a music feed and a photo feed. The music feed will comply with podcasting format and photos with photocasting as indicated. Each feed is preferably stored as a system file on the collection folder in the following names space: Music feed: MUSIC_RSS; Photo feed: PHOTOS_RSS.

The Computational viewpoint partitions the systems into functional modules. This viewpoint is concerned with how the system assembles from an Object Oriented standpoint, taking the perspective of a designer of application components and program interfaces. This viewpoint corresponds to the UML logical model.

The collection controller preferably recognizes when a person is selecting a collection listing for the first time. If this is the case, it preferably copies/uploads a sample collection show for this user. These preferably come from a standard folder pre-populated with music and images. These files are preferably copied into the user's library and a collection is created so that they own the files. If the user does not have the capacity, or the files are not present, or for some other reason the population were to fail, the user preferably does not see an error. The Show Application may start without a pre-populated sample show.

Generally, a user 302 cannot make a show 204 unless they have accepted the legal terms 306. If a user wants to make a link to a file in another file system, or in another user's account; it is preferably copied to the local user's Collection Library.

Figure 4:
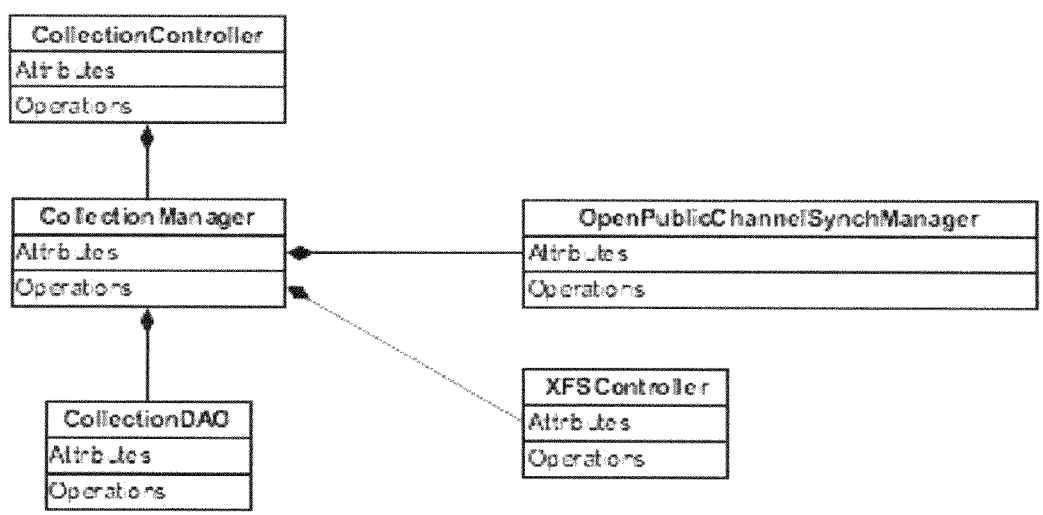
FIG. 4 is a schematic depiction of the collection system showing various aspects and relationships between individual elements thereof.

FIG. 4 shows a data model 400 for a collection object such as collection 202. This object preferably represents a collection 202. It preferably relates to the file object 102.

The CollectionController is a controller level EJB. It handles the business logic, such a permissions, quota, etc. The CollectionManager object 404 handles any transaction and synchronization rules for collections. This is where the RSS, XML, and SYMLINK synchs are preferably placed. The CollectionDAO 406 is a DAO (Data Access Object) handles any I/O to the database persistence level.

For the Collection Library inside of the XFS Collection Folder, there is preferably a main "Library" folder. This folder represents a container for "real" files instead of links. It handles files that a user wishes to place in a collection that are not currently in the XFS.

If a user uploads directly into a collection, it is preferably uploaded into the Library folder and linked to the appropriate collection. If a user places an asset from an External File System into a collection, it is preferably copied to the user's Library and linked to the appropriate collection.

The Library is preferably not a flat folder and may be hashed for better processing. Files are preferably placed into sub folders to prevent the Library from being a large flat folder. Subfolders are optionally created as used based upon the date the file is added to the Library. For example, if a file is added on Aug. 17, 2006; it is preferably placed in: /My Collections/Library/2006/08/17.

The Public Channel Synchronization Manager is preferably utilized by the XFS File driver layer. Some synchronization concerns include the occurrence of many serial synchs and of one-to-many synchs. For example, a user might carry out actions rapidly on the same file that would cause a series of synching actions requiring many serial synchs. Only the last action would be or might be relevant. For example, a client might open, write, and close a file multiple times within several seconds. Each one of these may cause a synch action. In a preferred embodiment, DAMS gathers up the synchs for a window and only apply the last one.

Sometimes, a single file may be in multiple collections. Changing the one root file, may spawn multiple synching actions, requiring a one to many synch. DAMS provides a mechanism to generate symlinks in java. System calls may be made along the lines of the web page (http://www.cenqua.com/fisheye/demo/viewrep/ant/src/main/org/apache/tools/ant/taskdefs/optional/unix/Symlink.java?r.=1.28) or by a—JNI Call.

DAMS Uses, an RSS generator to create or update RSS manifests of the files in the collection. One feed may be for the music, and one for the photos. These manifest feeds preferably list the assets in the order in the collection show data. These manifests are preferably a secondary data stream (system file) in XFS attached to the collection folder. The collection folder's modification date is preferably updated with this file. It is preferably updated whenever a file is added, a file is deleted, a file is updated, a file is renamed, and/or Collection meta-data is updated.

Each collection preferably has a folder created for the user's public channel asset folder. The folder is preferably named after the collection's PUBLIC ID. The security of the collection may be based upon using this PUBLIC ID as a claim check key. Each asset in the collection is preferably symlinked in this folder. The RSS manifest files preferably are also symlinked in this folder. They are preferably named: rss_photo.xml rss_music.xml. Whenever a collection changes, these symlinks are preferably synched.

DAMS preferably accomplishes centralized cache management to the data access layer and preferably synchronizes cache population when justified. It is seen as best to simplify the SessionData class and to avoid resource leaks and excessive memory consumption. It is seen as being better to avoid stale objects lingering in the cache The cache manager controls cache lifecycles and manages session state. The cache manager maintains a map of cache maps. The outside map associates sessions with a map of caches. A WeakHashMap is used to avoid memory leaks. The inner map associates cache names with caches. The caches associate arbitrary keys with arbitrary values, but by convention they are either identity caches (0) or query caches (0). Caches are lazily initialized. The first time a request is made for a cache for a particular session and a particular name, the cache manager creates one. The cache manager does not need to maintain a fixed list of the cache names. Some characteristics of the Cache Manager are shown in FIG. 5.

JAAS Subject (Java Authentication and Authorization Service) is used as the basis for the user context. Developers can extend the context by adding and accessing JAAS principals.

The ContextManager (FIG. 6) is a singleton that stores the current JAAS SessionData Principal object on a ThreadLocal. The current ContextManager uses a ThreadLocal to keep track of context. This may change or be expanded in future implementations, but the ContextManager will generally hide this. This allows DAMS to move caching to a deeper layer without changing the APIs to pass in the SessionData object. The current session is set in XDLoginContext.getSubject( ) immediately after the SessionData object for the current request is first determined.

Figure 6:
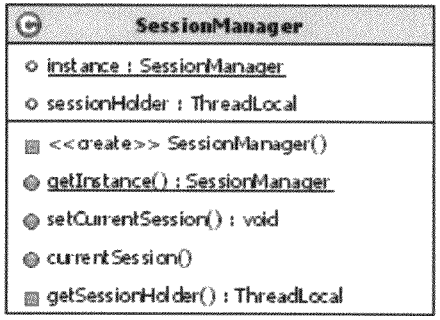
FIG. 6 is a graphic and textual representation of the SessionManager.

Shown in FIG. 6 are some characteristics of the ContextManager object.

Of particular note is that the "SessionManager" header is incorrect in FIG. 6 and the string/term "ContextManager" should be substituted therefor.

Identity caches may be used to associate any key object with any value object. However, by convention transfer objects are preferably cached in a consistent fashion. The name of the cache is preferably the fully qualified name of the transfer object class, and the cache is preferably keyed by the transfer object's seq values. These caches are known as "identity caches" because they are commonly used in persistence frameworks to ensure consistent object identity when the same object is retrieved from the database multiple times within the same session. Convenience methods on CacheManager facilitate caching and retrieving transfer objects. There are no special classes for identity caches—it is simply a convention.

Sometimes data access patterns are not satisfied by identity caches. For example, the application retrieves all system file objects in a parent folder. Because the system file IDs are not known, the identity caches cannot be used. Query caches are used in such cases. Like identity caches, query caches are a convention and do not have special classes. A query cache has a one-to-one relationship with a PL/SQL procedure. The cache is keyed by the parameter or parameters to that procedure, and the value is a List of values returned by the query.

If the List contains transfer objects, these objects are also placed in the appropriate identity cache. If the procedure takes more than one parameter, the cache is keyed by QueryParameters. A QueryParameters object is essentially a wrapper around an array with an equals( ) method that checks for equality between each member in the array. This allows the cache to find cached results when the same parameters are passed in twice. The equals( ) methods on Collections and arrays test identity and therefore if used to store the parameter values would not find a match in the cache.

When an object is updated or deleted, it is preferably removed from all caches. Unlike identity caches, the cache manager has no way of knowing in which query caches an object may exist. The DAOs are preferably responsible for removing entries from the appropriate query caches. However, another embodiment implements the solution employed by Hibernate. Hibernate solves this problem by not storing the transfer objects themselves in the query cache, but instead storing the objects' class names and identifiers (seqs), and storing the transfer objects in the identity caches only.

When an object is updated or deleted, it is removed from its identity cache and the query caches are left untouched. When a query cache is accessed, the identifiers are used to look up the transfer objects in the identity caches. If one of the transfer objects cannot be found in the identity caches, either that object alone can be retrieved from the database, or the whole query can be re-executed.

Figure 7:
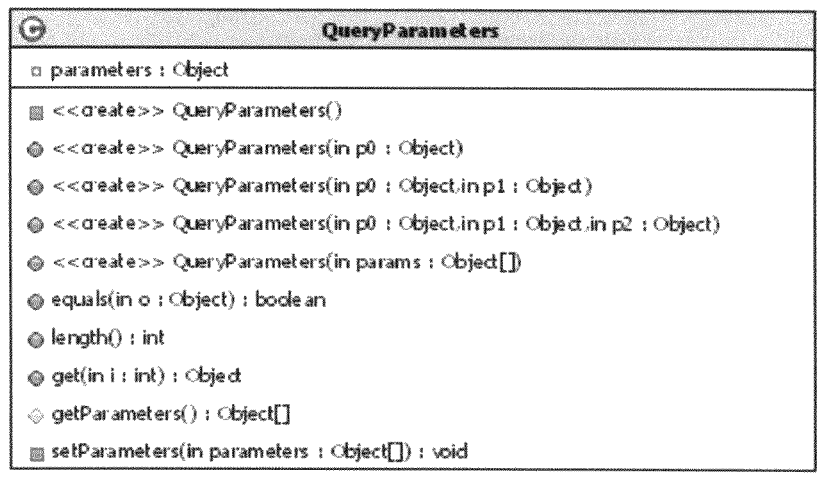
FIG. 7 is a graphic and textual representation of the QueryParameters.

Shown in FIG. 7 are some characteristics of the QueryParameters object. The cache manager is preferably called from the Data Access Object (DAO) classes. Methods that read from the database will check the cache before executing queries, and will cache new values as they are read. Methods that delete or update records will remove stale records from the cache.

The cache manager is registered as an MBean (a management bean under the JMX API). The following actions may be performed on the cache manager through JMX: read cache hits by cache name, read cache misses by cache name, read number of sessions, read number of caches, read cache size by name, read cache size by session, read cache size by name and session, purge cache by session, purge cache by name, purge cache by session and name, change default max cache size, change max cache size by name, change default cache timeout, and change cache timeout by name.

To avoid stale objects lingering in caches, a timestamp is preferably added to each entry in the cache. When an object is retrieved from the cache, it is preferably discarded and re-read from the database if it is too old. Timestamps are not updated when an object is read from the cache. A default timeout is specified in install.properties. The default value may be overwritten in install.properties and timeouts may be configured on a per-cache basis. Further, caches may be purged through the JMX interface based on session, cache name, or both. When the max cache size is reached and a new object is added, the oldest object in the cache is removed.

The memory footprint of the caches may become a problem as the number of concurrent users increases. Three mechanisms are preferably employed to avoid excessive memory consumption and memory leaks. The cache manager associates caches with sessions in a WeakHashMap, caches store values through soft references, and the number of objects in cache may not exceed a configurable maximum size. Although these measures effectively avoid memory leaks, they do not make excessive memory consumption impossible. A potential change is to store the cached values in a WeakHashMap. While significantly reducing the probability of memory errors, using a WeakHashMap increases the probability that the cached entries will be garbage collected prematurely, defeating the purpose of the cache.

At least one cache in the system apparently benefits from synchronization and there may be others. Synchronizing the population of this cache significantly reduces the number of redundant calls to the database. The synchronizedFind( ) method on AbstractDAO (FIG. 8) performs this synchronization, and may be reused if and when there are other caches that benefit from synchronization. Because this method adds considerable complexity and because most caches do derive significant benefit from its use, it is not used by default. The method takes a cache key, a cache name, a Query (FIG. 10), and a QueryParameters object (FIG. 7). The method looks up the key in the cache. If found, the value is returned, else it enters a synchronization block. This block is synchronized on a Mutex object (FIG. 9) that holds the current session, the cache, and the key. If a second thread using the same parameters hits the synchronized block before the first thread finishes, the getMutex( ) method ensures that the identical Mutex object is returned. This ensures that the second thread will not enter the block. The block performs a second check of the cache to ensure that the cache was not populated while the thread was waiting. The Query is then executed with the Query parameters. The results of the query and are then placed in the cache using the provided key. If the query returned null, a special CACHED_NULL_INDICATOR is put in the cache to differentiate a null result from an un-initialized value.

Figure 9:
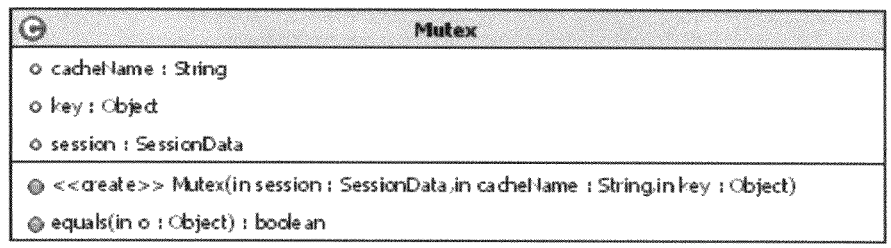
FIG. 9 is a graphic and textual representation of the Mutex.
Figure 10:
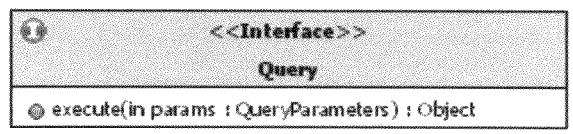
FIG. 10 is a graphic and textual representation of a query interface.

Some characteristics of these and other objects and/or operations are shown herein, just below, and in FIGS. 8-10.

```
protected final Object synchronizedFind(final Object key, final
QueryParameters params,
        final Query query, final String cacheName){
    SessionData session = ContextManager.getInstance(
).currentSession( );
    Object value = CacheManager.getInstance( ).get(cacheName,
key);
    if (value = = null){
        Mutex mutex = getMutex(session, cacheName, key);
        synchronized(mutex){
            value = CacheManager.getInstance( ).get(cacheName,
key);
            if (value = = null){
                value = query.execute(params);
                value = value=
                =null?CACHED_NULL_INDICATOR:value;
                CacheManager.getInstance( ).put(cacheName,
key, value);
            }
        }
    }
    return value= =CACHED_NULL_INDICATOR?null:value;
}
```

Caches are currently session scoped. That is, an object cached by one session may not be referenced by a second session. Objects that are frequently read and infrequently, written benefit from shared caching at the JVM scope. Objects in a shared cache may be referenced by multiple sessions. No need for shared caching has arisen, but the functionality could easily be added to the cache manager.

In one embodiment, the XFS File driver only handles AOL Pictures actions. This changes with the deployment of DAMS. The XFS File driver is preferably fully used by the Xdrive kernel.

There are two basic perspectives when looking at file the permission model: the process of determining what access a specified user has for a particular file or folder, and the results of a calculated determination of the file/folder access.

Figure 11:
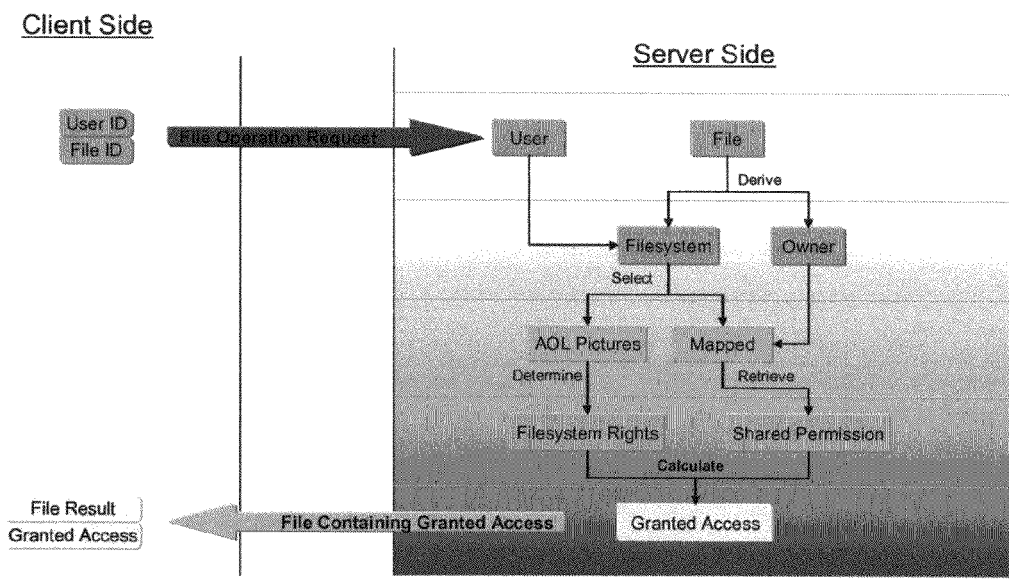
FIG. 11 is a schematic representation of structural relationships and data flow for a preferred file permission model.

As indicated in FIG. 11, to obtain what file access a user 1112 has, the file permission model system 1100 needs to know how the owner 1102 of such file wanted to share the file 1104. When a file is shared, the owner of a file is another Xdrive, DAMS, or other user. Otherwise, if it's not a shared resource, the file system takes ownership responsibilities. This difference is classified as "Shared Permission" 1106 where the owner's declaration controls how he/she wants to share a folder, and "File System Rights" 1108 where access rights are implicit to the file system driver.

A file system driver can use Shared Permission 1106 and File System Rights 1108 in combination to calculate the file access.

For Shared Permission there are preferably no changes to the existing permissions model for sharing folders. In one embodiment, it is database driven and follows a hierarchy model. See http://twiki.nscp.aoltw.net/twiki/bin/view/Main/XFSPermissionModel. To summarize, shared permissions declare what actions the user can NOT perform. By or'ing this with the hierarchy tree of shared permission, the resulting list of actions the user cannot do is obtained. Invert this result with a binary "NOT" operation and the result is access granted 1110.

For Example:
Step 1) Folder can NOT be: Modify
Step 2) Parent of folder states children (subfolders) can NOT be: Written
Step 3) OR the step 1 and 2, target file can NOT be: Modified, Written
Step 4) NOT to obtain granted access, target file CAN be: Read With the introduction of Collections into the DAMS, Xdrive files can now be referenced from an alias. Aliases will naturally inherit their granted access from their source file except for the "DELETE" and "CREATE ALIAS" actions when the collection is mapped. When a collection is not mapped, alias creation and deletion action will always be allowed.

File system rights 1108 are an access protection scheme implicit to the file system itself. These rights are determined by the driver. For example, AOL Pictures 1114 may not allow a creation of a folder in any folder except the "My Albums" folder. This can be translated directly into granted access.

Granted access 1110 is generally a set of flags indicating the file actions the user CAN perform. The list of access flags are: READ—reading a file or listing a folder, DELETE—deleting a file or folder, MODIFY—modifying the meta information of a file or folder, SHARE—sharing this file or folder to others, WRITE—(file only) editing the content of a file, CREATE FILE—(folder only) creating a sub file in the target folder, and CREATE FOLDER—(folder only) creating a sub folder in the target folder The granted access is preferably implemented as a "GrantedAccess" class contained inside the FileObject 1120. The GrantedAccess class will contain properties matching the list of access flags. The client can apply this granted access to the User Interface logic. The system will, optimize this process by caching the granted access so that it is calculated only once.

Collection Integration may occur and a library folder is preferably created when a collection alias is created for AOL Pictures files. The process is preferably as follows. If the library folder does not already exist, a folder called "Media Library is created." The file is copied into the "Media Library" folder. If a file with the same name already exists, copy the new file as "filename (copy #)." Example: "Blue Sky (2).gif." Otherwise, copy the file into the Media Library as is.

Symbolic links may be synchronized and triggered for same as appropriate.

A SmartId, such as the Xdrive Smart File ID may be used having a Format in the form of FS-MountId-DF-ID-System-Specific using a Delimiter ('-' dash). Where FS is the File System abbreviated codes which are XFS—all files located on Zdrive; APFS—all files located on AOL Pictures; MPFS—all files located on Xdrive but was mapped from another user; and CLT—Xdrive Collection Manager.

DF is a Flag indicating if its a 'F' file type or 'D' directory type;

ID is the id used by the underlining file system. It can not contain dashes; and SystemSpecific is any other information can be added to the ID required by the driver. Fields can be separated by dashes Certain File System Specific parameters are as follows.

XFS MountId is the file seq of the root folder, ID is the seq of the file or folder, and SystemSpecific is a DOMAIN code used by the JSON client. For APFS, MountId is the "AOL Pictures" folder, ID is the AOL Pictures id, SystemSpecific is a ParentID Trail excluding MountId in the format: GrandParentId-xxx-ParentId. For MPFS, MountId is the seq which is the top level folder of the share for this user, ID is the seq of the file or folder from the owner's file tree, and SystemSpecific is the DOMAIN code used by the JSON client To Migrate XFS files into the new file system the code XdFileBean is preferably moved into the XfsControllerBean, FileManagerBean, XdFileSystemResource and MappedFileSystemResource. FileObject is preferably converted from a FileObject into an interface.

Figure 12:
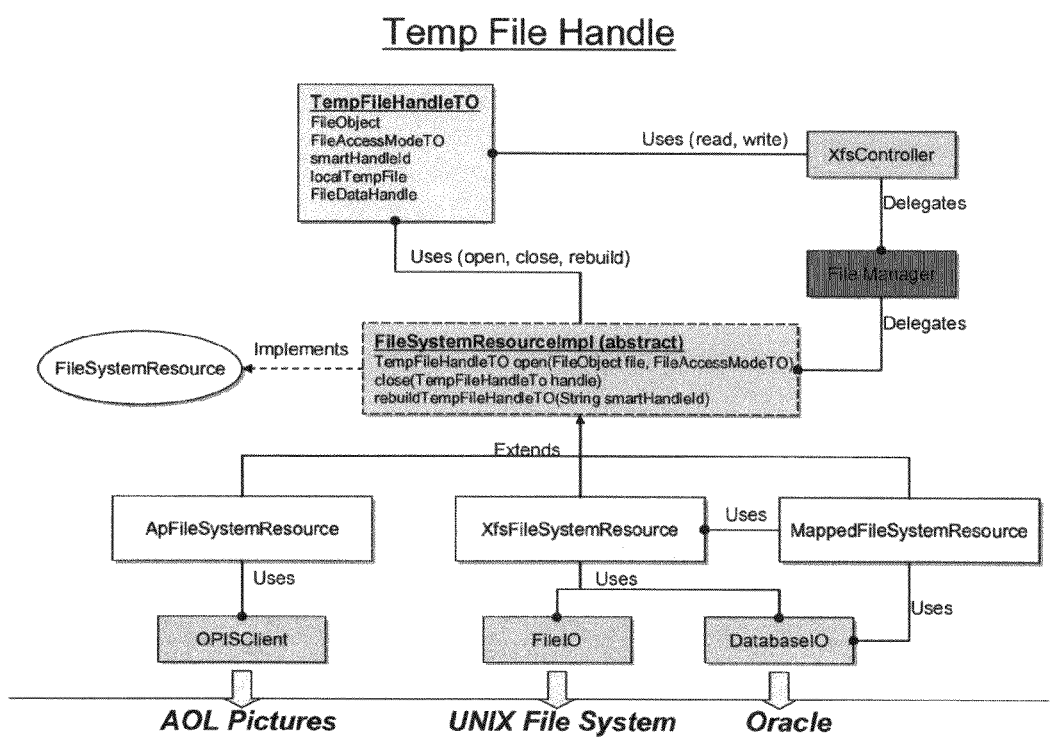
FIG. 12 is a schematic representation of the elements and relationships for the temp file handle.

The TempFileHandle system uses the Temp File Handle Model as indicated in FIG. 12. The Temp File Handle system 1200 is designed to accommodate the following features. Transactional write so file editing preferably only persists to the actual file when editing is complete and the file is in a stable non-corrupted state. Random Access read so if the file system driver only supports stream read, this temp file handle will provide the support for block read. Random Access write as this temp file handle will provide the support for block write.

File access mode is a function of the driver. The file access modes not supported by the file system driver are preferably supported by the temp file handle. The temp file handle can be rebuilt using the smartHandleId (FIG. 12). The access mode is preferably restored to ensure that the specific file action is supported by this handle. For a transactional write, if the file system driver supports block-level writes, the changes to the file identified by the temp file handle are preferably applied from a change log. Otherwise, the changed file is preferably copied using stream writes.

A Temp File Handle Smart ID may be used. This ID is preferably smart enough rebuild the temp file handle with the following information: FileID, FileAccessMode, UserID, Actual Local temp filename—the temp file name is the full Id. The Format is FileAccessMode:UserID:FileID: UniqueId with a Delimiter: in the form of a colon and the format elements as follows. ':' FileAccessMode: File System abbreviated code (SR—Stream Read BR—Block Read SW—Stream Write BW—Block Write); UserID—User Id of the user performing the action; FileID: The smart ID of the file; and UniqueID: Unique ID created every time a file is opened.

Below are Class changes arising from the DAMS.
FileSystemResource
New Methods
rebuildTempFileHandleTO(TempFileHandleTo handle)
close(TempFileHandleTo handle)
createFile(FileObject folder, FileObject file, TempFileHandleTo source)
TempFileHandleTO open(FileObject file, FileAccessModeTO)
TempFileHandleTO open(FileObject file, FileAccessModeTO, Namespace)
Removed Methods
close(FileDataHandle fileHandle)
createFile(FileObject folder, String name, FileDataHandle source)
FileDataHandle open(FileObject file)
FileDataHandle open(FileObject file, Namespace namespace)
Notes
1) FileSystemResource will rely on FileSystemResourceImpl class for close( )
2) open( ) will implement any access mode it can provide, otherwise it calls super.open( ) for all Namespace.ORIGINAL
3) rebuildTempFileHandleTO will not be implemented in driver
FileSystemResourceImpl Abstract Class
New Methods
close(TempFileHandleTo handle)
TempFileHandleTO open(FileObject file, FileAccessModeTO)—only for original file reuildTempFileHandleTO (TempFileHandleTo handle)
Notes
1) open( ) will create a temp buffer
2) close( ) will
a) perform instanceof(this) to determine driver
b) if driver is XFS do a change log copy
c) if driver is not do a stream copy
3) rebuildTmpeFileHandleTO( ) will rebuild the TempFileHandleTO using:
a) smartHandleId
b) FileManagerBean to object the original FileObject
TempFileHandleTO
Variables
FileObject
FileAccessModeTO
String smartHandleId
File local tmp file
FileDataHandle
New Methods
TempFileHandleTO(smartId, FileObject, FileAccessModeTO, File)
TempFileHandleTO(smartId, FileObject, FileAccessModeTO, FileDataHandle)
getDataInput( )—using tmp file
getDataOuput( )—using tmp file
getInputStream( )—using FileDataHandle
getOutputStream( )—using tmp file
getHandleId( )
getFileObject( )
Reused Methods
getFileAccessMode( )
getTempFileHandle( )
getTempFileType( )
getTempWriterHandle( )
toString( )

Methods Kept for Backward Compatibility
TempFileHandleTO(smartId)
isSparse( )
Methods Unknown Until Implementation
TempFileHandleTO( )
getConcurrentWriterCount( )
getDestinationFile( )
getNewLength( )
getSparse( )
isNewFile( )
setConcurrentWriterCount(int)
setDestinationFile(FileObject)
setFileAccessMode(FileAccessModeTO)
setIsNewFile(boolean)
setNewLength(long)
setSparse(boolean)
setTempFileHandle(FileDataHandle)
setTempFileType(long)
setTempWriterHandle(String)

The front-end of DAMS preferably fully supports SmartId for all files including XFS files. The Drivers may be refactored to enable stateless services using thread context.

An Engineering viewpoint exposes the distributed nature of the system. This viewpoint contains information on how the components from the computational viewpoint are implemented. The JSON gateway and the digital asset management system ("DAMS") client preferably use the DSP JSON v1.1 gateway and API: http://twiki nsc-p.aoltw.net/twiki/bin/view/Main/JsonAPI_v11. The JSON v1.1 API is preferably updated to allow for seeing if a user has accepted the legal agreement and providing and/or maintaining a setting if the user has accepted the legal agreement.

A Technological viewpoint describes the "where" to apply technologies to implement the system, and the technologies of choice. This viewpoint maps the components described in the computational viewpoint (interfaces, API's, objects) to the technologies to implement the engineering viewpoint. The viewpoint is responsible for ensuring that the choices conform to the requirements of the system. This is preferably achieved by using standard Xdrive J2EE systems. See the Computational view and related FIG. 4, above.

Storage may preferably be a mixture of NAS devices including NetApps, OnStore, and iBrix. Apache 2.2 may be a web server of choice. The underlying UNIX style file system for symlink support is preferred. All storage preferably must support UNIX name space and symlink support. All public servers are preferably forbidden to write to or alter the underlying storage.

Each collection will require a public channel asset folder. This is a real folder created on the user's Network Storage mount. For example:

| User | 456567 |
|---|---|
| Company | 15678 |
| Mount Point | /mnt/xdrive45/1/plus/ |

This user would have all of their files "live" in: /mnt/xdrive45/1/plus/15678/567/456567/. When this user uploads, their files are temporarily stored in their mount point's temporary directory. For example, /mnt/xdrive45/1/plus/temp/Keeping staging and a user's final file storage on the same device allows for atomic moves between staging and final storage. Similarly, public channels are preferably symlink representations of the XFS file system. They will exist on the same device as the primary files. Just as each mount has a "/temp" directory. Each mount will preferably have a "/pub_html" directory. Symlinks to primary data in the user's directory are preferably placed here. These symlinks are read only. These symlinks are intended to be used by standard file services such as Apache Web, RSS, etc.

User Public Channel Asset Folders are generally needed as each time a user creates a collection, they are preferably enabling another public channel. This structure preferably mirrors the user's home directory structure: [USER MOUNT]/pub_html/[USER COMPANY]/[USER HASH]/[USER ID] In this directory, there are preferably sub directories and symlinks. Primary data will never be stored here.

Use may be made of an external rewriting function similar to what is described in http://httpd.apache.org/docs/2.2/mod/mod_rewrite.html#rewritemap. A simple program may be created that will enable addressing such as: http://public.x-drive.com/~xchilly/fui67fg2/rss_photo.xml. In this case, user xchilly would be mapped to his local mount at: [mount]/[pub dir]/[user dir]//mnt/xdrive45/1/plus/pub_html/1584200/567/345567/. So, the URL would be the equivalent of: http://public.xdrive.com/xdrive45/1584200/567/345567//fui67fg2/rss_photo.xml.

To obtain a homepage view, this program may require a database view to be available for this query. Results are preferably cached.

A public domain should be established. Currently, it is public.xdrive.com. A user migration process (as from Xdrive to DAMS) is preferably updated to handle moving of symlinks.

Figure 13:
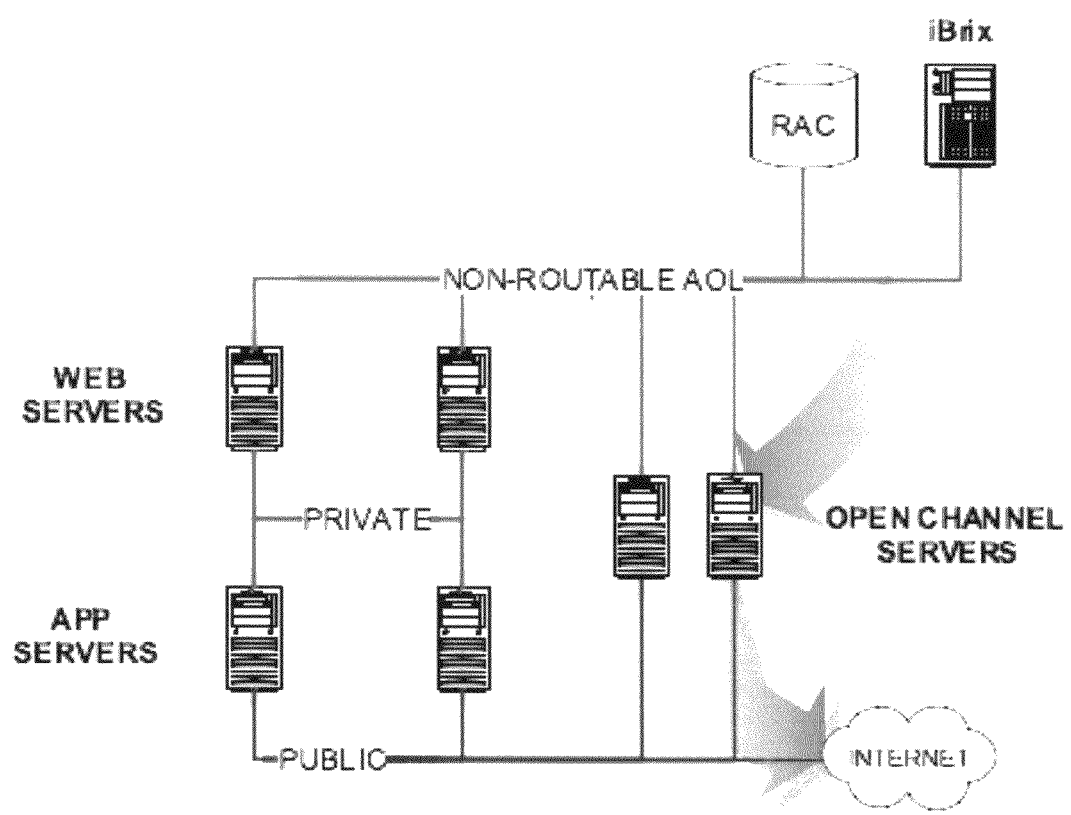
FIG. 13 is a schematic representation of individual server and communication elements for a preferred embodiment of the present system.

Certain system requirements are shown schematically in FIG. 13. The system 1300 has non-routable AOL communication channels 1302 present between the RAC/Oracle 1304 and IBrix 1306 systems and the web servers 1308 and open channel servers 1310. The open channel servers 1310 are in communication with the Internet 1312 over a public communication channel system 1314. The web servers 1308 communicate between each other and application (app) servers 1316 over a private network 1318. The application servers also communicate to and with the Internet over public communication channels 1314.

Open Channel Servers may be added as needed. Preferably, Apache 2.2 servers handle static contents. They may serve files from the iBrix storage. They will only need access to specific directories. These directories will contain symlinks to files in inaccessible directories. It is assumed that the iBrix devices will properly handle symlinks and mask the real location from the Apache servers. In this way, Apache can be granted read only access to specific user files by creating symlinks. The Apache 2.2 Open Channel Servers will need READ ONLY access to the iBrix storage.

Information regarding official RSS specifications may be obtained from the following.
RSS General: http://en.wikipedia.org/wiki/RSS_%28file_format%29
RSS 2.0: http://blogs.law.harvard.edu/tech/rss
Apple Podcasting: http://www.apple.com/itunes/podcasts/techspecs.html Below, additional information is provided with respect to XDSP required namespaces, music podcasting information and photocasting information.
XDSP Required Namespaces
General
xmlns:content="http://purl.org/rss/1.0/modules/content/"
xmlns:xd sp=http://www.xdrive.com/XDSPAPI/v1.1/
Music (Podcasting) Namespace Extensions
xmlns:media="http://search.yahoo.com/mrss/"
xmlns:itunes="http://www.itunes.com/dtds/podcast-1.0.dtd"
Music (Podcast)
Music (Podcast) Template

```xml
<?xml version="1.0" encoding="UTF-8"?>
<rss version="2.0" xmlns:media="http://search.yahoo.com/mrss/"
xmlns:itunes="http://www.itunes.com/dtds/podcast-1.0.dtd">
<channel>
<title>{COLLECTION.TITLE}</title>
<link>{URL TO COLLECTION 'PICKUP PAGE'}</link>
<description>{COLLECTION.DESCRIPTION}</description>
<pubDate>{TIMESTAMP WHEN FEED WAS GENERATED}</pubDate>
<lastBuildDate>{TIMESTAMP WHEN FEED WAS GENERATED}</lastBuildDate>
<generator>XDSP OpenChannel FeedGen v1.0</generator>
<guid isPermaLink="false">XDSP_{COMPANY SEQUENCE}_{USER SEQUENCE}_{COLLECTION SEQUENCE}_MUSIC</guid>
<language>en-US</language>
<itunes:summary>{COLLECTION.DESCRIPTION}</itunes:summary>
<itunes:subtitle>Soundtrack for Xdrive Shared Slideshow
'{COLLECTION.TITLE}'.</itunes:subtitle>
<itunes:author>{USER.FIRST NAME} {USER.LAST NAME}</itunes:author>
<itunes:owner>
<itunes:email>{USER.EMAIL ADDRESS}</itunes:email>
<itunes:name>{USER.FIRST NAME} {USER.LAST NAME}</itunes:name>
</itunes:owner>
<itunes:category text="Society & Culture"><itunes:category text="Personal
Journals" /></itunes:category>
<itunes:explicit>no</itunes:explicit>
<item>
<title>{SONG.ID3 TITLE}</title>
<link>{URL TO DOWNLOAD FULL SONG FILE}</link>
<description />
<pubDate>{SONG.LAST MODIFIED TIMESTAMP}</pubDate>
<guid isPermaLink="false">XDSP_{COMPANY SEQUENCE}_{USER SEQUENCE}_{COLLECTION SEQUENCE}_{FILE SEQUENCE}</guid>
<media:content url="{URL TO DOWNLOAD FULL SONG FILE}" fileSize="{SONG.SIZE IN BYTES}" type="audio/mpeg"></media:content>
<itunes:duration>{SONG.DURATION IN SECONDS}</itunes:duration>
<itunes:subtitle></itunes:subtitle>
<itunes:author>{SONG.ID3 ARTIST}</itunes:author>
<enclosure url="{URL TO DOWNLOAD FULL SONG FILE}" length="{SONG.SIZE IN BYTES}" type="audio/mpeg" />
</item>
</channel>
</rss>
```

Music (Podcast) Feed Example

```xml
<?xml version="1.0" encoding="UTF-8"?>
<rss version="2.0" xmlns:media="http://search.yahoo.com/mrss/"
xmlns:itunes="http://www.itunes.com/dtds/podcast-1.0.dtd">
<channel>
<title>The Tea Garden</title>
<link>http://plus.xdrive.com/uc/pickup_page_claimcheck</link>
<description>Just a few shots of my walk through the Japanese tea garden up
in Golden Park. The park is in San Francisco and is an amazingly beautiful
place.</description>
<pubDate>Mon, 28 Aug 2006 13:56:22 -0800</pubDate>
<lastBuildDate>Mon, 28 Aug 2006 13:56:22 -0800</lastBuildDate>
<generator>XDSP OpenChannel FeedGen v1.0</generator>
<guid isPermaLink="false">XDSP_1454564_876786876876_8976974987_MUSIC</guid>
<language>en-US</language>
<itunes:summary>Just a few shots of my walk through the Japanese tea garden
up in Golden Park. The park is in San Francisco and is an amazingly
beautiful place.</itunes:summary>
<itunes:subtitle>Soundtrack for Xdrive Shared Slideshow 'The Tea
Garden'.</itunes:subtitle>
<itunes:author>Chad Hill</itunes:author>
<itunes:owner>
<itunes:email>xchilly@aol.com</itunes:email>
<itunes:name>Chad Hill</itunes:name>
</itunes:owner>
<itunes:category text="Society & Culture"><itunes:category text="Personal
Journals" /></itunes:category>
<itunes:explicit>no</itunes:explicit>
<item>
<title>Beside You In Time</title>
<link>http://staging.xdrive.com/rss/music/beside_you_in_time.mp3</link>
<description />
<pubDate>Mon, 28 Aug 2006 11:26:42 -0800</pubDate>
<guid isPermaLink="false">XDSP_1454564_876786876876_8976974987_43558</guid>
<media:content
```

-continued

```
url="http://staging.xdrive.com/rss/music/beside_you_in_time.mp3"
fileSize="6496268" type="audio/mpeg"></media:content>
<itunes:duration>324</itunes:duration>
<itunes:subtitle></itunes:subtitle>
<itunes:author>Nine Inch Nails</itunes:author>
<enclosure url="http://staging.xdrive.com/rss/music/beside_you_in_time.mp3"
length="6496268" type="audio/mpeg" />
</item>
<item>
<title>Right Where it Belongs</title>
<link>http://staging.xdrive.com/rss/music/right_where_it_belongs.mp3</link>
<description />
<pubDate>Mon, 28 Aug 2006 11:25:16 -0800</pubDate>
<guid isPermaLink="false">XDSP_1454564_876786876876_8976974987_43557</guid>
<media:content
url="http://staging.xdrive.com/rss/music/right_where_it_belongs.mp3"
fileSize="6100778" type="audio/mpeg"></media:content>
<itunes:duration>304</itunes:duration>
<itunes:subtitle></itunes:subtitle>
<itunes:author>Nine Inch Nails</itunes:author>
<enclosure
url="http://staging.xdrive.com/rss/music/right_where_it_belongs.mp3"
length="6100778" type="audio/mpeg" />
</item>
</channel>
</rss>
```

25

Photocast
Photocast Template

```
<?xml version="1.0" encoding="utf-8"?>
<rss version="2.0" xmlns:content="http://purl.org/rss/1.0/modules/content/"
xmlns:xdsp="http://www.xdrive.com/XDSPAPI/v1.1/">
        <channel>
            <title>{COLLECTION.TITLE}</title>
            <link>{URL TO COLLECTION 'PICKUP PAGE'}</link>
            <description>{COLLECTION.DESCRIPTION}</description>
            <pubDate>{TIMESTAMP WHEN FEED WAS GENERATED}</pubDate>
            <lastBuildDate>{TIMESTAMP WHEN FEED WAS
    GENERATED}</lastBuildDate>
            <generator>XDSP OpenChannel FeedGen v1.0</generator>
            <guid isPermaLink="false">XDSP_{COMPANY SEQUENCE}_{USER
    SEQUENCE}_{COLLECTION SEQUENCE}_PHOTO</guid>
            <xdsp:show transition="{SHOW.TRANSITION CODE}"
    rate="{SHOW.RATE}" fitToMusic="{SHOW.FIT TO MUSIC FLAG}">
                <xdsp:order type="photo">
                    <xdsp:frame>{GUID OF FIRST PHOTO}</xdsp:frame>
                    <xdsp:frame>{GUID OF SECOND PHOTO}</xdsp:frame>
                </xdsp:order>
                <xdsp:order type="music">
                  <xdsp:frame>{GUID OF FIRST SONG}</xdsp:frame>
                    <xdsp:frame>{GUID OF SECOND SONG}</xdsp:frame>
                </xdsp:order>
            </xdsp:show>
            <item>
                <title>{PHOTO.TITLE}</title>
                <link>{URL TO DOWNLOAD FULL PHOTO FILE}</link>
                <xdsp:smallThumbnailLink>{URL TO DOWNLOAD 100 x 100
    THUMBNAIL}</xdsp:smallThumbnailLink>
                <xdsp:mediumThumbnailLink>{URL TO DOWNLOAD 500 x 375
    THUMBNAIL}</xdsp:mediumThumbnailLink>
                <pubDate>{PHOTO.LAST MODIFIED TIMESTAMP}</pubDate>
                <description>{PHOTO.DESCRIPTION}</description>
                <content:encoded>
                <![CDATA[{PHOTO.DESCRIPTION}<BR>
                <a href="{URL TO DOWNLOAD FULL PHOTO FILE}"><img
    src="{URL TO DOWNLOAD 100 x 100 THUMBNAIL}"></a>]]>
                </content:encoded>
                <enclosure url="{URL TO DOWNLOAD FULL PHOTO FILE}"
    type="image/jpeg"/>
                <guid isPermaLink="false">XDSP_{COMPANY SEQUENCE}_{USER
    SEQUENCE}_{COLLECTION SEQUENCE}_{FILE SEQUENCE}</guid>
            </item>
        </channel>
</rss>
```

Photocast Feed Example

```
<?xml version="1.0" encoding="UTF-8"?>
<rss version="2.0" xmlns:media="http://search.yahoo.com/mrss/"
xmlns:itunes="http://www.itunes.com/dtds/podcast-1.0.dtd">
<channel>
<title>{COLLECTION.TITLE}</title>
<link>{URL TO COLLECTION 'PICKUP PAGE'}</link>
<description>{COLLECTION.DESCRIPTION}</description>
<pubDate>{TIMESTAMP WHEN FEED WAS GENERATED}</pubDate>
<lastBuildDate>{TIMESTAMP WHEN FEED WAS GENERATED}</lastBuildDate>
<generator>XDSP OpenChannel FeedGen v1.0</generator>
<guid isPermaLink="false">XDSP_{COMPANY SEQUENCE}_{USER SEQUENCE}_{COLLECTION
SEQUENCE}_MUSIC</guid>
<language>en-US</language>
<itunes:summary>{COLLECTION.DESCRIPTION}</itunes:summary>
<itunes:subtitle>Soundtrack for Xdrive Shared Slideshow
'{COLLECTION.TITLE}'.</itunes:subtitle>
<itunes:author>{USER.FIRST NAME} {USER.LAST NAME}</itunes:author>
<itunes:owner>
<itunes:email>{USER.EMAIL ADDRESS}</itunes:email>
<itunes:name>{USER.FIRST NAME} {USER.LAST NAME}</itunes:name>
</itunes:owner>
<itunes:category text="Society & Culture"><itunes:category text="Personal
Journals" /></itunes:category>
<itunes:explicit>no</itunes:explicit>
<item>
<title>{SONG.ID3 TITLE}</title>
<link>{URL TO DOWNLOAD FULL SONG FILE}</link>
<description />
<pubDate>{SONG.LAST MODIFIED TIMESTAMP}</pubDate>
<guid isPermaLink="false">XDSP_{COMPANY SEQUENCE}_{USER SEQUENCE}_{COLLECTION
SEQUENCE}_{FILE SEQUENCE}</guid>
<media:content url="{URL TO DOWNLOAD FULL SONG FILE}" fileSize="{SONG.SIZE IN
BYTES}" type="audio/mpeg"></media:content>
<itunes:duration>{SONG.DURATION IN SECONDS}</itunes:duration>
<itunes:subtitle></itunes:subtitle>
<itunes:author>{SONG.ID3 ARTIST}</itunes:author>
<enclosure url="{URL TO DOWNLOAD FULL SONG FILE}" length="{SONG.SIZE IN
BYTES}" type="audio/mpeg" />
</item>
</channel>
</rss>
```

As indicated and/or set forth above, many advantages, utilities, applications, and solutions are provided by the present invention which will be apparent from a review of the specification herein and accompanying drawings. The foregoing are some of but a few of the goals sought to be attained by the present invention and are set forth for the purposes of example only and not those of limitation.

While the present invention has been described with regards to particular embodiments, it is recognized that additional variations of the present invention may be devised without departing from the inventive concept.

What is claimed is:

1. A system for maintaining collections of digital assets, the system comprising:
a storage medium that stores instructions; and
at least one processor that executes the instructions to perform operations comprising:
maintaining a plurality of collections of digital assets, each collection of digital assets being associated with one or more users of a plurality of users;
associating a first set of metadata with a first collection of digital assets from the plurality of collections of digital assets, the first collection of digital assets being associated with a first user from the plurality of users, the first set of metadata comprising metadata selected by the first user and metadata automatically identified, wherein the metadata automatically identified is based on:
the metadata selected by the first user; and
a historical pattern analysis of other metadata without selection by the first user;
receiving a request, from a device of the first user, to display digital assets from the first collection of digital assets, the request being based on metadata from the first set of metadata;
in response to the request, identifying a subset of digital assets from the first collection of digital based on the selected metadata and the automatically identified metadata, and providing to the device of the first user the identified subset of digital assets;
detecting one or more changes to the collections of digital assets; and
in response to the detecting, synchronizing the detected one or more changes to the subset of digital assets provided to the device of the first user.

2. The system of claim 1, wherein synchronizing the detected one or more changes to the subset of digital assets comprises synchronizing byte-level differences between updated digital assets.

3. The system of claim 1, wherein synchronizing the detected one or more changes to the subset of digital assets is restricted based on digital assets excluded from synchronizing.

4. The system of claim 1, wherein synchronizing the detected one or more changes to the subset of digital assets comprises delivering a synchronization notice to the device of the first user indicating a predetermined amount of time before a synchronization.

5. The system of claim 1, wherein synchronizing the detected one or more changes to the subset of digital assets comprises maintaining a log comprising at least one of a synchronization success or failure, and a source path of each synchronized digital asset.

6. The system of claim 1, wherein the at least one processor further performs operations comprising sharing the subset of digital assets, the shared digital assets comprising visual indicators specifying sharing permissions and users who have received the asset.

7. The system of claim 6, wherein the at least one processor further performs operations comprising providing a notification to the device of the first user based on at least one of a reception of a shared digital asset from another user, or updates to the shared subset of digital assets by another user.

8. The system of claim 1, wherein the first set of metadata selected by the first user is editable.

9. The system of claim 1, wherein the settings associated with the first user include collecting options that associate metadata previously selected by the first user with a date of digital assets and a file type of digital assets.

10. The system of claim 1, wherein associating a first set of metadata with a first collection of digital assets comprises:
providing a dialog box to the first user when the metadata selected by the first user matches metadata previously selected by the first user; and
receiving, through the dialog box, a preference selection by the first user.

11. A method for maintaining collections of digital assets, the method comprising the following operations performed by at least one processor:
maintaining a plurality of collections of digital assets, each collection of digital assets being associated with one or more users of a plurality of users;
associating a first set of metadata with a first collection of digital assets from the plurality of collections of digital assets, the first collection of digital assets being associated with a first user from the plurality of users, the first set of metadata comprising metadata selected by the first user and metadata automatically identified, wherein the metadata automatically identified is based on:
the metadata selected by the first user; and
a historical pattern analysis of other metadata without selection by the first user;
receiving a request, from a device of the first user, to display digital assets from the first collection of digital assets, the request being based on metadata from the first set of metadata;
in response to the request, identifying a subset of digital assets from the first collection of digital based on the selected metadata and the automatically identified metadata, and providing to the device of the first user the identified subset of digital assets;
detecting one or more changes to the collections of digital assets; and
in response to the detecting, synchronizing the detected one or more changes to the subset of digital assets provided to the device of the first user.

12. The method of claim 11, wherein synchronizing the detected one or more changes to the subset of digital assets comprises synchronizing byte-level differences between updated digital assets.

13. The method of claim 11, wherein synchronizing the detected one or more changes to the subset of digital assets is restricted based on digital assets excluded from synchronizing.

14. The method of claim 11, wherein synchronizing the detected one or more changes to the subset of digital assets comprises delivering a synchronization notice to the device of the first user indicating a predetermined amount of time before a synchronization.

15. The method of claim 11, wherein synchronizing the detected one or more changes to the subset of digital assets comprises maintaining a log comprising at least one of a synchronization success or failure, and a source path of each synchronized digital asset.

16. The method of claim 11, further comprising sharing the subset of digital assets, the shared digital assets comprising visual indicators specifying sharing permissions and users who have received the asset.

17. The method of claim 16, further comprising providing a notification to the device of the first user based on at least one of a reception of a shared digital asset from another user, or updates to the shared subset of digital assets by another user.

18. The method of claim 11, wherein the first set of metadata is editable.

19. A non-transitory computer readable medium that stores instructions for maintaining collections of digital assets, the instructions being executable by at least one processor to perform operations comprising:
maintaining a plurality of collections of digital assets, each collection of digital assets being associated with one or more users of a plurality of users;
associating a first set of metadata with a first collection of digital assets from the plurality of collections of digital assets, the first collection of digital assets being associated with a first user from the plurality of users, the first set of metadata comprising metadata selected by the first user and metadata automatically identified, wherein the metadata automatically identified is based on:
the metadata selected by the first user; and
a historical pattern analysis of other metadata without selection by the first user;
receiving a request, from a device of the first user, to display digital assets from the first collection of digital assets, the request being based on metadata from the first set of metadata;
in response to the request, identifying a subset of digital assets from the first collection of digital based on the selected metadata and the automatically identified metadata, and providing to the device of the first user the identified subset of digital assets;
detecting one or more changes to the collections of digital assets; and
in response to the detecting, synchronizing the detected one or more changes to the subset of digital assets provided to the device of the first user.

* * * * *